United States Patent
Parker et al.

(10) Patent No.: US 9,230,250 B1
(45) Date of Patent: Jan. 5, 2016

(54) SELECTIVE HIGH-RESOLUTION VIDEO MONITORING IN A MATERIALS HANDLING FACILITY

(75) Inventors: Erik R. Parker, Seattle, WA (US); Kenneth C. Macfarlane, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 618 days.

(21) Appl. No.: 13/601,587

(22) Filed: Aug. 31, 2012

(51) Int. Cl.
H04N 7/18 (2006.01)
G06Q 20/20 (2012.01)
G08B 13/194 (2006.01)

(52) U.S. Cl.
CPC ............ *G06Q 20/203* (2013.01); *G08B 13/194* (2013.01)

(58) Field of Classification Search
CPC ... G06Q 20/203; H04N 7/181; G08B 13/194; G08B 13/196; G08B 13/19602; G08B 13/19606; G08B 13/19608; G08B 13/19613
USPC ................. 348/143, 152, 153, 150, 159, 169; 705/22.28; 340/540, 541, 568.1, 572.1
See application file for complete search history.

(56) References Cited

U.S. PATENT DOCUMENTS

| | | | |
|---|---|---|---|
| 2002/0064314 A1 | 5/2002 | Comaniciu et al. | |
| 2003/0107648 A1 | 6/2003 | Stewart et al. | |
| 2006/0115165 A1 | 6/2006 | Chao et al. | |
| 2006/0165386 A1 | 7/2006 | Garoutte | |
| 2006/0170769 A1 | 8/2006 | Zhou | |
| 2007/0013776 A1* | 1/2007 | Venetianer et al. | 348/143 |
| 2007/0291104 A1 | 12/2007 | Petersen et al. | |
| 2008/0122951 A1 | 5/2008 | Yamamoto | |
| 2008/0130948 A1 | 6/2008 | Ozer | |
| 2008/0288986 A1* | 11/2008 | Foster et al. | 725/62 |
| 2008/0303903 A1* | 12/2008 | Bentley et al. | 348/143 |
| 2009/0079830 A1 | 3/2009 | Ekpar | |
| 2009/0219387 A1 | 9/2009 | Marman et al. | |
| 2010/0002071 A1 | 1/2010 | Ahiska | |
| 2010/0026802 A1* | 2/2010 | Titus et al. | 348/143 |
| 2012/0038796 A1 | 2/2012 | Posa et al. | |
| 2012/0092494 A1 | 4/2012 | Garoutte et al. | |
| 2012/0242788 A1 | 9/2012 | Chuang et al. | |
| 2012/0242851 A1 | 9/2012 | Fintel et al. | |

* cited by examiner

*Primary Examiner* — Victor Kostak
(74) *Attorney, Agent, or Firm* — Robert C. Kowert; Meyertons, hood, Kivlin, Kowert & Goetzel, P.C.

(57) ABSTRACT

A video-based monitoring system may dynamically adjust the resolution or frame rate of video cameras in a materials handling facility in response to changing conditions or events. The resolution or frame rate may be increased when an agent authorized to handle high-value items (e.g., expensive items or those at high risk of being stolen) enters the field of view of a given camera in the facility. The system (or a video camera thereof) may detect the presence of the authorized agent by detecting that his clothing or equipment includes a color or pattern designating such authorization using analytics applied to a video stream captured by the camera. Other pre-defined conditions or events indicating that higher-resolution video monitoring is warranted may trigger an increase in the resolution or frame rate of a camera. The resolution or frame rate may be decreased when these conditions or events no longer apply.

24 Claims, 11 Drawing Sheets

SELECTIVE HIGH-RESOLUTION VIDEO MONITORING IN A MATERIALS HANDLING FACILITY

BACKGROUND

Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

When a customer places an order, one or several inventory items specified in the order are retrieved or "picked" from inventory and prepared for delivery to the customer. Traditionally, like items are stored together within inventory to facilitate inventory tracking and management. For example, items having a common Universal Product Code (UPC), Stock-Keeping Unit (SKU) code, International Standard Book Number (ISBN), or other designation (including proprietary designations) may be stored together within inventory. In some facilities, expensive items (e.g., jewelry) may be stored in vaults or in designated high-security inventory areas with restricted access.

In an inventory environment that includes a large number of many different items, it may be highly inefficient for a single employee to physically locate and pick every item for a given order. For example, different items specified in a given order may be stored at mutually remote locations within the inventory facility, which would require a single picking agent to traverse a long path through the facility. In some cases, in order to make better use of inventory stocking space, it may be desirable to stock different items together in a single storage location or stocking area.

Figure 1:
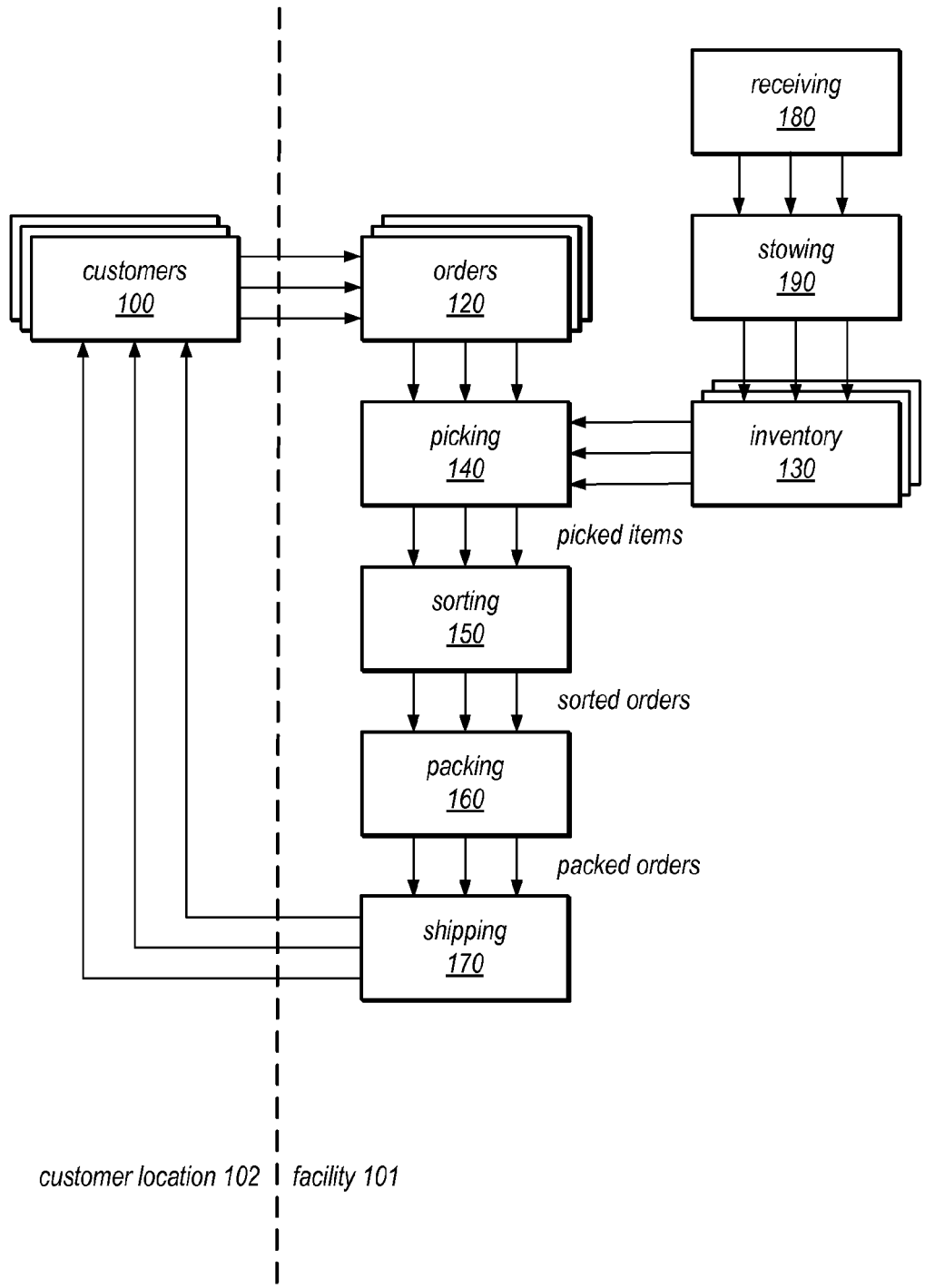
FIG. 1 illustrates a broad view of the operation of a materials handling facility, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

In a materials handling facility, in order to make better use of inventory stocking space, it may be desirable to stock different items together in a single storage location or stocking area. For example, expensive items may be stored in inventory areas along with less expensive items, which may complicate existing loss prevention mechanisms in the facility. High density video security systems may be installed to address loss prevention, workplace violence, the physical security of the facility and the agents working therein. However, it may be impractical and/or prohibitively expensive to always operate such system in a high-resolution mode (e.g., using a high resolution and/or frame rate) in a large materials handling facility. For example, a large number of cameras (such as would be required to provide coverage in a large materials handling facility) may generate a massive amount of data when they are operated in a high-resolution mode, even in a short period of time (e.g., one week or one month). Analyzing this data may require a lot of computing resources; storing this data may require a large investment in storage resources; and moving this data from the security system to storage may require very high bandwidth connections.

In some embodiments, the systems and methods described herein may provide a way to selectively apply high-resolution video monitoring (e.g., capturing video at a frame rate on the order of 25-30 frames per second and/or with high resolution) only when certain conditions or events indicate that it is warranted. For example, they may allow the activities of agents working in a materials handling facility to be monitored using high-resolution video only when such conditions or events exist. Otherwise, the operations of the facility may be monitored using lower-resolution video (e.g., capturing video at a frame rate on the order of 2-5 frames per second and with lower resolution). In some embodiments, using the systems and methods described herein, a clearer view of the activities of the agents may be obtained under conditions for which (according to various policies of the materials handling facility) it is believed that a higher risk of theft, product damage, or other types of product loss exist.

In some embodiments, the video-based monitoring systems described herein may be configured to dynamically adjust the resolution and/or frame rate of video cameras in a materials handling facility in response to changing conditions or events. For example, the resolution and/or frame rate for a given video camera in the facility may be increased when an agent who is authorized to handle high-value items (e.g., expensive items, items at high risk of being stolen, or items that have been designated as high-value items for any other reason) enters the field of view of the given video camera. In some embodiments, the video-based monitoring system (or a video camera thereof) may detect the presence of the high-value-authorized agent by detecting that his clothing or a device or piece of equipment that he is using includes a color or pattern designating that he is authorized to handle items designated as high-value items (which are sometimes referred to herein simply as "high-value items"). For example, analytics of the video camera itself or of a server or other computer may be applied to a video stream captured by the camera to detect the designated color or pattern and to adjust the resolution and/or frame rate accordingly. In some embodiments, other pre-defined conditions or events indicating that higher-resolution video monitoring is warranted may trigger an increase in the resolution or frame rate of a camera. For example, an adjustment of the resolution and/or frame rate of one or more video cameras may be initiated in response to receiving an indication of an alarm or alert in the facility or in response to detecting that a pre-defined movement or gesture is performed by an agent. The resolution and/or frame rate may subsequently be decreased when and if these trigger conditions or events no longer apply, in some embodiments.

An order fulfillment facility, or another type of materials handling facility, may employ a video-based monitoring system in various operations of the facility. FIG. 1 illustrates a broad view of the operations of a materials handling facility that is configured to utilize a video-based monitoring system such as that as described herein, according to one embodiment. In this example, multiple customers 100 may submit orders 120 to the distributor of the items in the facility, where each order 120 specifies one or more items (not shown) from inventory 130 to be shipped to the customer that submitted the order. In some embodiments, the orders may be submitted locally, such as by a customer that is present at the facility. In other embodiments, orders may be submitted remotely, such as through a network (e.g., Internet) based ordering system, a telephone-based ordering system, or physical mail (e.g., a catalog ordering system), among other possibilities (not shown). This is illustrated in FIG. 1 by the dashed line separating customers 100 (in customer location 102) from the other operations (located in facility 101). Note that a customer 100 may in various embodiments be a consumer, a distributor, a retailer, a buyer, a seller, or any other entity that places an order 120 to be fulfilled at facility 101, each of which interact with facility 101 using a different customer interface and/or service model.

In a materials handling facility, a picking agent, i.e., an agent engaged in a picking operation, may be provided instructions to locate and obtain a particular item from an inventory area. The instructions may include location, position, and/or descriptive information for the item (e.g., information stored in a product database on behalf of the materials handling facility), and may be usable by the picking agent to locate and identify the item to be obtained, or "picked." Similarly, a stowing agent, i.e., an agent engaged in a stowing operation, may be provided instructions to stow an item in a particular location and/or position in a given inventory area. Note that as used herein, the term "agent" may refer to a human person working in the materials handling facility. Note also that in various embodiments, an individual agent may act as a picking agent, a stowing agent, or an agent of another operation in the facility at different times, or may perform two or more roles while traversing the facility (e.g., picking some items and stowing others as they traverse the facility).

To fulfill the customer orders 120, the one or more items specified in each order may be retrieved or "picked" from inventory 130 (which may also be referred to as stock storage) in the materials handling facility, as indicated by block 140. In some embodiments, items may be identified from inventory based on information presented to facility personnel (i.e., agents) using any of a variety of communication devices. For example, the information presented may include directions to a particular inventory area within the facility, a description of the items to be picked, and/or position information for the items within a given inventory area. Picked items may be delivered to one or more stations (e.g., sorting stations, packing stations, re-binning stations, shipping stations) in the materials handling facility for sorting 150 into their respective orders, packing 160, and finally shipping 170 to the customers 100. Note that a picked, packed and shipped order does not necessarily include all of the items ordered by the customer; a shipped order may include only a subset of the ordered items available to ship at one time from one inventory-storing location. Additionally, if a customer 100 is present at the facility, the picked item(s) may be delivered directly to the customer 100 without being packed and/or shipped, or the customer 100 may be directed to pick them item(s) from the inventory areas of the facility, rather than having them picked for the customer by an agent of the facility, in various embodiments.

As illustrated in this example, a materials handling facility may also include a receiving operation 180 for receiving shipments of inventory items (i.e., stock) from various vendors and a stowing operation, illustrated as stowing 190, for placing the received stock into stock storage (inventory 130). In some embodiments, stowing 190 may involve stowing or placing an item in an inventory area within inventory 130 that is selected by a control system (e.g., randomly, pseudo-randomly, or according to various guidelines for stowing similar or different items within the facility). In some embodiments, items may be stored together based on their distinguishability from each other. For example, in some embodiments, the control system may be configured to automatically determine one or more inventory areas in which to stow an item such that the item is easily distinguishable from other co-located items. In other embodiments, an agent may select any inventory area in which there is room to stow the item, or may select any inventory area in which there is room for the item only if no similar items are already stored in that inventory area. Note that the arrangement and order of operations illustrated by FIG. 1 is merely one example of many possible embodiments of the operation of a materials handling facility that utilizes a video-based monitoring system. Other types of materials handling, manufacturing, or order fulfillment facilities, may include different, fewer, or additional operations and resources, according to different embodiments. Note also that the various operations of a materials handling facility may be located in one building or facility, or alternatively may be spread or subdivided across two or more buildings or facilities.

As described herein, a video-based monitoring system may be utilized in several areas of a materials handling facility, such as during stowing 190, picking 140, sorting 150, packing 160, and shipping 170. For example, in some embodiments a video-based monitoring system may be configured to capture and analyze video input from multiple cameras in the facility as agents store items in and/or retrieve items from inventory 130. In other embodiments, a video-based monitoring system may be configured to capture and analyze video input from sorting, packing, and/or shipping operations. As described in more detail below, a video-based monitoring system may in some embodiments be configured to select an appropriate resolution and/or frame rate for recording video input so that its resources are used efficiently. Such a video-based monitoring system may be configured to automatically adjust the resolution and/or frame rate of the video cameras in the system over time (e.g., individually and independently, or en masse) as appropriate to the particular circumstances. For example, certain pre-defined conditions or events in the facility (including those that involve or affect only a subset of the inventory areas in the facility) may indicate that high-resolution monitoring is warranted. In such embodiments, detection of these conditions or events may trigger an increase in the resolution and/or frame rate of the video camera or cameras trained on those portions of the facility in which the condition or event is detected or those inventory areas likely to be affected by the condition or event at a particular point in time. On the other hand, a default or standard resolution and frame rate (e.g., a relatively low-resolution and relatively low frame rate) may be sufficient for any video cameras trained on portions of the facility that are not involved in or affected by any of these pre-defined conditions or events at a particular point in time.

Figure 2:
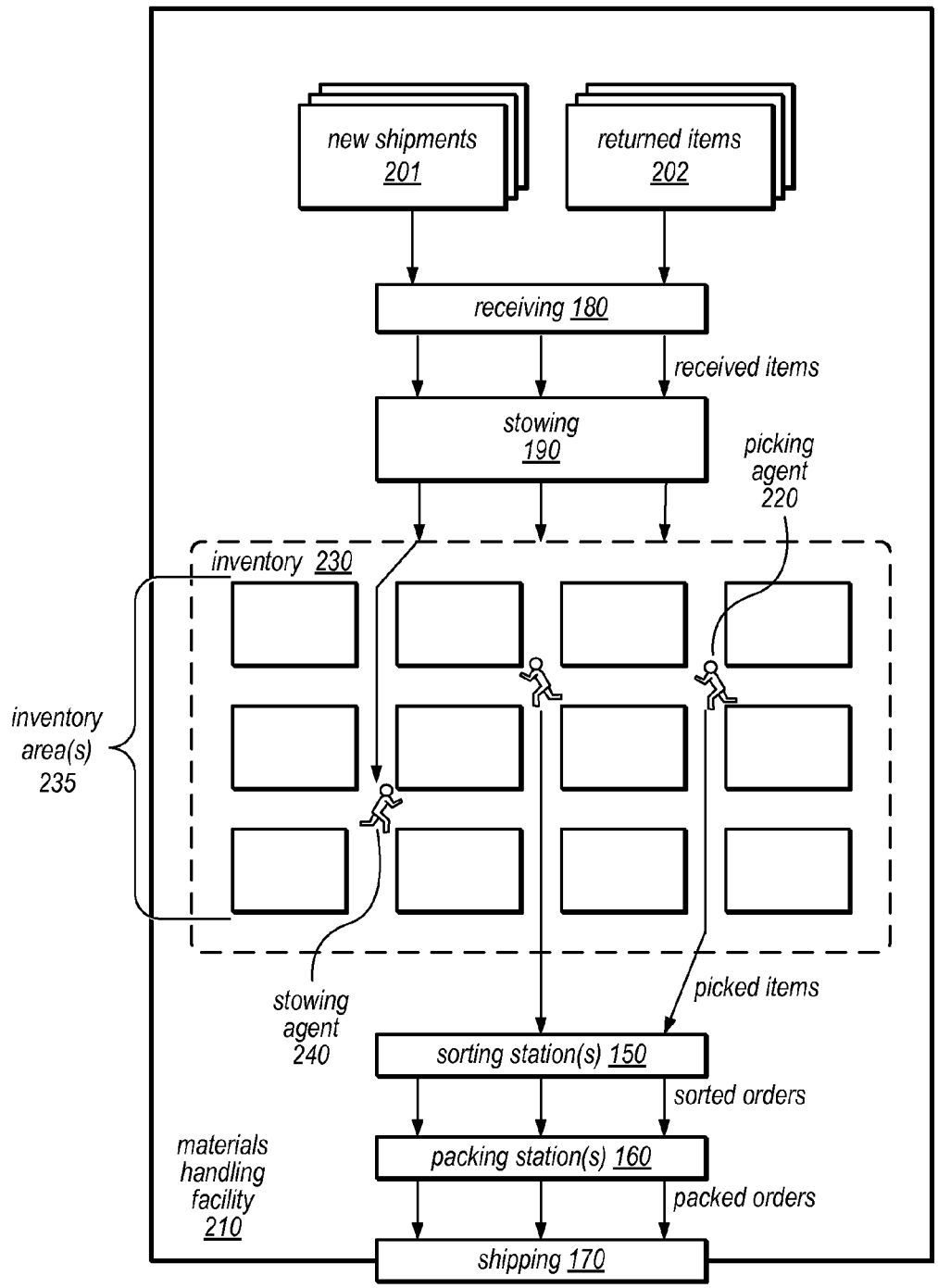
FIG. 2 illustrates an example physical layout of a materials handling facility, according to one embodiment.

The stations of a materials handling facility such as that described above may be arranged in many different configurations, according to different embodiments. FIG. 2 illustrates an example of a physical layout for a materials handling facility 210, according to one embodiment. In this example, items in inventory 230 may be marked or tagged with a bar-code, RFID tag, UPC, SKU code, ISBN, serial number, and/or other designation (including proprietary designations) to facilitate operations of materials handling facility 210, including, but not limited to, picking 140, sorting 150 and packing 160. These designations, or codes, may identify items by type, and/or may identify individual items within a type of item. At any time, one or more picking agents 220 may each be picking items (not shown) from inventory 230 to fulfill portions or all of one or more orders, and/or one or more stowing agents 240 may be placing items in inventory 230.

An order fulfillment facility such as materials handling facility 210 illustrated in FIG. 2 may implement an order fulfillment control system (or control system for short) as part of its overall inventory management system. The control system may include hardware and software configured for assisting and/or directing agents in the materials handling facility 210 in fulfilling customers' orders. For example, the control system may provide information to picking agents 220 and stowing agents 240 to increase speed and efficiency when locating items from among different items that may be co-located in a single inventory area 235 and when stowing items within an inventory area 235. In some embodiments, the control system may be configured to access location, position and/or descriptive information for items (e.g., from a product database or other data store) and may provide this information to picking agents 220 along with other information indicating items to be obtained from inventory. For example, a control system may provide instructions to a communication device (e.g., for display on or by that device) for directing a picking agent 220 to a particular inventory area 235, and additional information (e.g., position information and/or descriptive information) to assist the agent in locating one or more items in an inventory area 235 (e.g., "green mug, $3^{rd}$ from right", "wide, red box on far left", "video camera on left," or "solid black video camera"). After obtaining items from inventory 230, picking agents 220 may transfer those items to sorting stations 150, to a packing station 160, or to a combination sorting and packing station (not illustrated). While, in some embodiments, automated sorting may be utilized, in other embodiments sorting may be performed manually. Once an order is completed at a sorting station 150, the order may be ready to proceed to a packing station 160 to be packaged for shipping 170.

A materials handling facility may include one or more receiving stations 180 for receiving shipments of inventory items from various vendors or other sources. For example, both new shipments 201 and returned items 202 may be received at the facility. The received stock may then be placed into stock storage in one or more inventory areas 235 of inventory 230 during a stowing operation (illustrated as stowing 190 in FIG. 1). In some embodiments, the control system may provide instructions to a stowing agent 240 to direct the agent to a particular inventory area 235, and may present additional information (e.g., text or image information) to assist the agent in locating a specific position within the inventory area 235 in which an item is to be placed. The control system may include, or may be used in conjunction with handheld, mobile and/or fixed scanners or scanning devices that may be able to scan the marks or tags on individual items and/or inventory areas 235 to determine and record an identifier of an item and/or an item location.

In some embodiments, An indicator of the inventory area in which the item is stowed and/or its position within that inventory area may be stored in a product database and associated with a product identification code or other item or product information. This indicator may include a description of the inventory area, an inventory area location number, or other data representing the inventory area in which the item is stored in the facility, indexed by a product identification code, for example. In some embodiments, an indicator of the item's specific position within the inventory area may be associated with the corresponding item's identifier, and may be stored in such a database along with an identifier of the item and/or an identifier of the inventory area. In some embodiments, descriptive information may also be stored in the database along with position information at this time, while in other embodiments such information associated with the item may be stored separately and/or at a different time. In some embodiments, an indication of whether the item is considered to be a "high-value" item (for the purposes of loss prevention) or a "lower-value item" may be stored in the database along with other descriptive information. As previously noted, an identifier of the item may include an item's inventory identification number, UPC, SKU code, ISBN, model number, version number and/or other designation (including proprietary designations), according to various embodiments. In various embodiments, any or all of this information may then be available to control system devices, communication devices, or other computer devices used in subsequent operations of the facility.

The control system may in some embodiments be configured to determine the location and/or position of a picking agent 220 or a stowing agent 240 (e.g., using an indirect asset tracking device or other communication device worn or carried by the agent) and may generate stowing or picking instructions for the agent that are dependent on the agent's current location within inventory 230. As described in more detail below, the control system (or a separate control component of a video-based monitoring system) may be configured to receive video information from and/or control the operation of multiple cameras in materials handling facility 210. For example, the facility may include enough video cameras so that the fields of vision of the video cameras collectively encompass all of the inventory areas of the materials handling facility, or all of the operations of the facility.

As noted above, in various embodiments, items may be stored in inventory areas by an agent randomly, pseudo-randomly or according to one or more guidelines, or may be stored in an inventory area or location within an inventory area selected for each item automatically, such as by software executing on a control system. An agent or control system may record the selected inventory area for each item in a product database (which may include a description, inventory location number, or other data representing the inventory area in which the item is to be stored), along with position and/or descriptive information for the item, indexed by a product identification code, for example. Some facilities may store items having the same UPC, SKU code, ISBN or other identifier in different individual inventory areas within stock storage. Storing these items in multiple inventory areas may shorten the distance, and therefore the time, required to obtain an item from inventory, in some embodiments. Additionally, different items may be stored in a single inventory area, according to certain embodiments. Storing different items together may result in more efficient use of total inventory space than using a single inventory area for a single item or product. It still may be beneficial in some embodiments to store similar items together to make better use of inventory space. For example, storing different books together on a single inventory shelf may use the available inventory space more efficiently than storing one book among other items of greatly differing size and shape, such as electronic devices, clothing, toys, hardware, materials, or other items. Thus, in some embodiments, a materials handling facility may store items of similar shape and size together in a single inventory area. For instance, in such an embodiment, items such as books, CDs, and DVDs may all be stored together.

In some embodiments, multiple items sharing a common UPC, SKU code, ISBN, or other identifier may be stored together with multiple items sharing a different UPC, SKU code, ISBN, or other identifier. For example, a single inventory area may store multiple copies of each of several different books, CDs, or other items. In some embodiments, items may be randomly stored together in inventory areas. Such random storage may increase storage efficiency and may in some cases increase the likelihood that any individual item may be easily distinguished from the other items with which it is stored. Random storage of items may also decrease the amount of time needed to store individual items into inventory. For example, a stowing agent may begin with a pushcart full of items and may proceed to one of the inventory areas in the facility. For each item in the pushcart, the stowing agent may look for an empty space on a shelf in the inventory area in which he is working that is large enough to hold the item. Once he locates an appropriately sized space, he may put the item there, and then scan a bar code on the shelf and a bar code on the item to let the system know where the item was stowed. This information may be stored in the product database for subsequent use in locating the specific item (e.g., the specific copy of an item of a particular type).

As described above, multiple, different product items may be stored together in a single inventory area, such as a shelf, rack, bin, or drawer. For example, a facility may store items such as books, CDs, DVDs, low-cost electronic devices, expensive electronic devices, jewelry, clothing, toys, hardware, materials, and/or other items together in various combinations within each inventory area. In some embodiments, by employing the video-based monitoring systems described herein, increased security may be employed in particular portions of the facility on an as-needed basis by increasing the resolution and/or frame rate of the video cameras trained on those portions of the facility only when agents are handling high-value items in particular areas or in response to other pre-defined conditions or events. In other words, rather than directing the storage of high-value items to a particular high-security section of the facility (e.g., one that has been designated for the storage and handling of high-value items), the systems described herein may allow high-value items to be stored anywhere in inventory without the need to perform full-time, high-resolution video monitoring (e.g., video monitoring using high resolution and/or frame rate) throughout the facility.

As used herein, the term "high-value item" may refer to expensive items (i.e., those with a high monetary value as compared to other items being handled in the materials handling facility) and/or to items that are considered to be at high risk of being stolen (e.g., according to historical loss prevention data, the popularity and/or novelty of the items, the ease with which they may be stolen, the ease with which they may be re-sold once stolen, or other factors). As used herein, the term "lower-value item" may refer to an item that is considered to be at low risk of being stolen. For example, an expensive item that is very small (e.g., a high-end digital camera or other portable electronic device, or a piece of jewelry) may be considered a high-value item because it may be easy for an agent to conceal on his person (e.g., in a pocket). On the other hand, another expensive item (e.g., a high-end television or professional video camera) may be considered a lower-value item for the purposes of the video-based monitoring systems and loss prevention processes described herein because it may be difficult to remove the item without being discovered. In some embodiments, items that are not expensive, but that are nonetheless at high risk of being stolen (e.g., limited edition items; collector's items; pre-release copies of much-anticipated books, movies or software products; or highly popular, though reasonably-priced, electronic devices) may be considered high-value items in this context.

Figure 3:
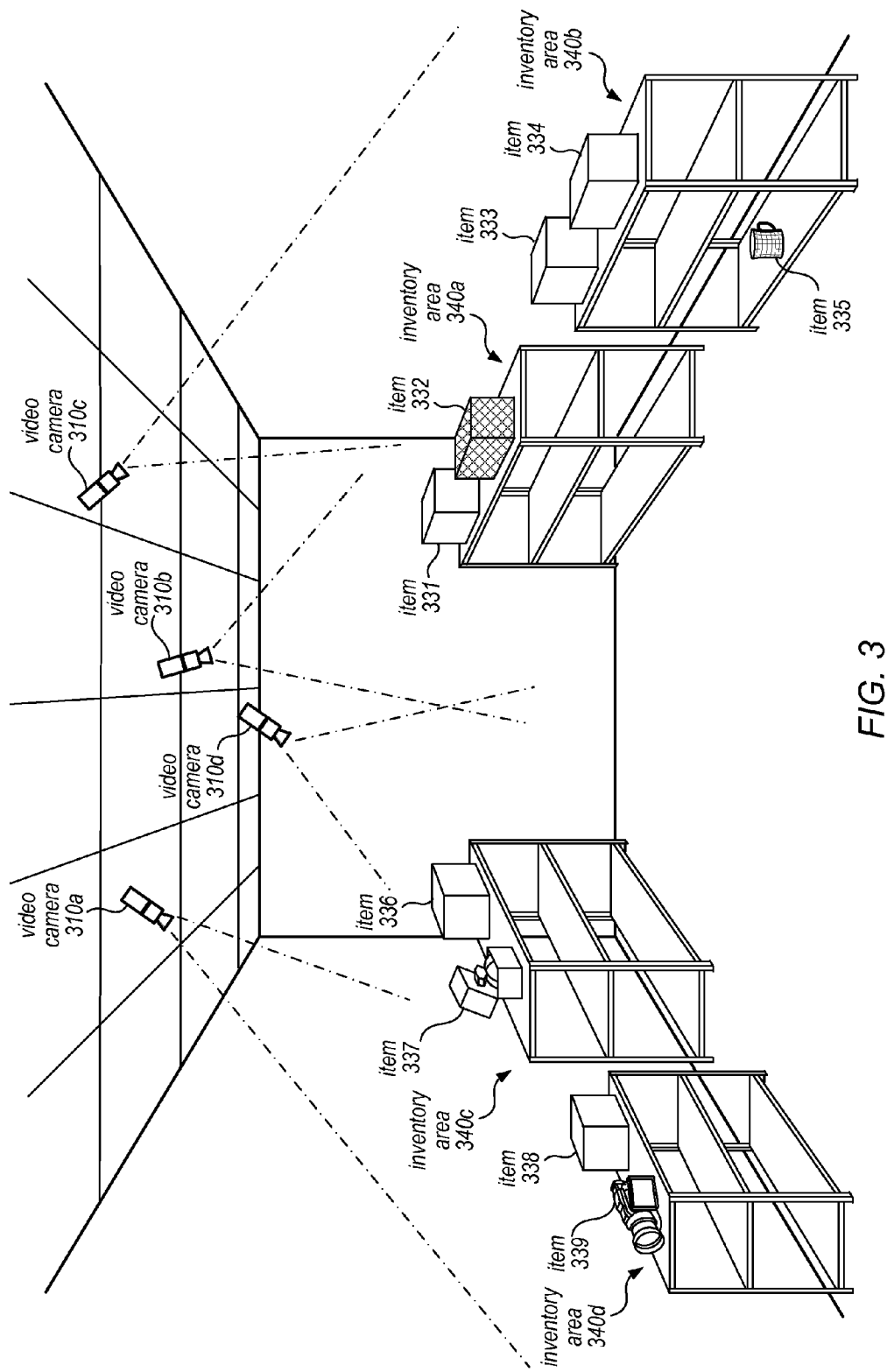
FIG. 3 illustrates a portion of a materials handling facility that employs a video-based monitoring system, according to one embodiment.

FIG. 3 illustrates a portion of a materials handling facility that employs a video-based monitoring system, according to one embodiment. In this example, video cameras 310a-310d are mounted in different locations on the ceiling to monitor activities in or near inventory areas 340a-340d. In this example, each of the video cameras 310 is trained on a different portion of the facility such that the collective field of view from the four cameras encompasses all of inventory areas 340a-340d and the space in the surrounding aisles. For example, the field of view for video camera 310a includes a portion of inventory area 340c and all of inventory area 340d; the field of view for video camera 310b includes a portion of inventory area 340a and a portion of the aisle between the two rows of inventory areas; the field of view for video camera 310c includes a portion of inventory area 340a and all of inventory area 340b; and the field of view for video camera 310d includes a portion of inventory area 340c and a portion of the aisle between the two rows of inventory areas.

In this example, inventory areas 340a-340d store a variety of different types of items, some of which may be considered high-value items and others of which may not be considered high-value items. In the example illustrated in FIG. 3, inventory area 340*a* stores items 331 and 332, neither of which is considered a high-value item; inventory area 340*b* stores two lower-value items 333 and 334, and one high-value item 335 (e.g., a popular collector's item); inventory area 340*c* stores one lower-value item 335, and one high-value item 337 (e.g., an expensive piece of jewelry); and inventory area 340*d* stores one lower-value item 338, and one item 339 that may or may not be considered a high-value item, according to different policies employed in the facility. For example, item 339 may be an expensive video camera, but may be too large to be likely to be stolen. Therefore, item 339 may not be considered a high-value item for the purposes of the video-based monitoring and/or loss prevention processes described herein, whereas a smaller item with the same monetary value may be considered a high-value item in this context.

As illustrated in this example, multiple cameras (e.g., video cameras that communicate with a control system and are components of a video-based monitoring system) may be used to monitor operations in such a materials handling facility, including, but not limited to, stowing and picking operations. In some embodiments, each of these cameras may be configured to operate using a default or standard resolution and/or frame rate (e.g., a relatively low resolution and/or frame rate) until or unless a condition or event is detected that indicates closer scrutiny of the area on which the camera is trained is warranted. By operating the cameras using the default or standard resolution and/or frame rate the vast majority of the time, the video-based monitoring system may not require the vast amounts of computing resources, storage resources, and connectivity resources that would be required if the system operated in a high-resolution mode all the time.

The selection of video cameras and/or combinations of video cameras to be used in a given facility may be dependent on a variety of factors, including, but not limited to: the area that can be covered by each type of video camera, the total area of the facility to be covered by the video cameras, the supported angles of the video cameras (e.g., ceiling-mounted cameras might not be suitable for a facility with 30-foot high ceilings and 3-foot wide aisles), and/or the complexity of the desired functionality. The selection of video cameras for a given facility and/or a location within that facility may be dependent in part on the operations that need to be monitored in the facility or in particular locations within the facility. For example, cameras supporting variable-resolution video, variable frame rates, and/or built-in video analytics may be required (or desirable) in some locations within the facility (e.g., in areas where agents may be handling high-value items unobserved by other agents). In other areas (e.g., areas in which no agents will be handling high-value items or high-traffic areas in which any suspicious activity is likely to be noticed) video cameras that support only low resolution video and/or low frame rates, and/or video cameras may be sufficient.

In some embodiments, the video cameras of a video-based monitoring system may be fixed in position (rather than movable or able to be repositioned, once installed). The video cameras may be arranged according to a layout that ensures that every area of the materials facility has video monitoring coverage at all times. For example, in some embodiments each video camera in a grid of video cameras installed on the ceiling of the materials handling facility may be configured to provide coverage for a particular section of a given aisle (e.g., a section that is 25 feet long). In some embodiments, an array of video cameras may be mounted on the ceiling of the facility, and/or a series of such devices may be mounted on walls, floors, poles, or shelving units within the facility. The video cameras may be networked together (e.g., wirelessly or by wire) and may be configured to communicate with a control system, such as to receive messages from the control system that include instructions executable on the cameras to adjust their resolution and/or frame rates, as described herein. A control system may communicate with the video cameras of a video-based monitoring system according to any of a number of different communication protocols, such as via TCP/IP, HTTP, 802.11, Bluetooth, etc., in various embodiments.

In some embodiments, the video analytics applied to captured video to determine when and if to increase the resolution and/or frame rate for a given video camera may perform object recognition, face recognition, and/or color or pattern distinction in near-real time. In some embodiments, the video-based monitoring system may employ high-end video cameras that include digital signal processing (DSP) capability. In such embodiments, some or all of the analytics described herein may be performed on the cameras themselves. For example, these video cameras may be able to detect motion, to detect motion in a particular direction, to perform simple color matching, and/or to perform other basic video analysis tasks, in some embodiments.

In other embodiments, a server or other computer that is a component of the video-based monitoring system may accept video footage from one or more video cameras and may perform the analytics on that footage. In some embodiments in which the analytics can be performed on the camera, they may be performed prior to compressing the footage and getting it off the camera (e.g., prior to moving it to a server for further processing and/or to a storage device). In embodiments in which the analytics are performed on another component of the video-based monitoring system, the data may be compressed on the camera, sent to the other component, and decompressed by other component in order to run the analytics, after which it may be re-compressed. For example, a backend server may receive video streams from a camera, analyze them, and send signals back to the camera to initiate increasing or decreasing the resolution and/or frame rate, when appropriate. In different embodiments, a trade-off between the complexity and/or performance of the system when running the analytics and the higher cost of the high-end cameras that can run some or all of the analytics (which may be on the order of an additional $100 for each camera of a system that may include thousands of cameras) may be made in different ways.

Figure 4:
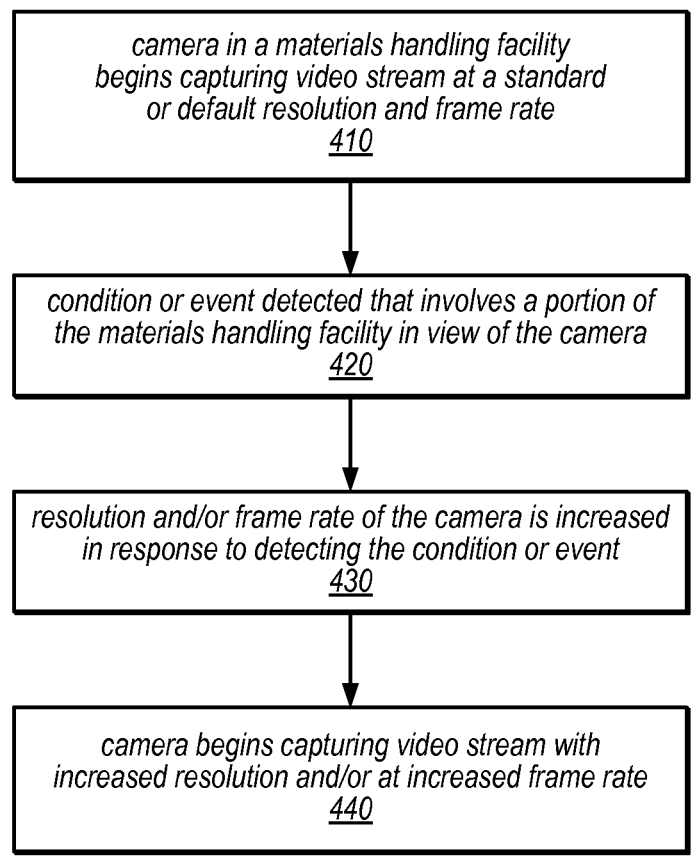
FIG. 4 is a flow diagram illustrating one embodiment of a method for performing selective high-resolution video monitoring in a materials handling facility.

One embodiment of a method for performing selective high-resolution video monitoring in a materials handling facility is illustrated in the flow diagram in FIG. 4. As illustrated in this example, the method may include a camera in a materials handling facility beginning to capture a video stream at a standard or default resolution and frame rate (e.g., an initial relatively low resolution and an initial relatively low frame rate), as in 410. When a condition or event is detected that involves a portion of the materials handling facility in view of the camera (shown as 420), the resolution and/or frame rate of that camera may be increased in response to detecting the condition or event, as in 430. For example, a condition or event that has been pre-defined as one that indicates closer scrutiny of the operations in the facility is warranted and that involves or may affect the portion of the materials handling facility that is in the field of view of the camera may be detected (e.g., using analytics performed on the video camera itself or analytics applied by a server or other computer that receives and analyzes a video stream). In response, the camera may be configured to increase its own resolution and/or frame rate, or a control system may provide instructions to the camera to cause the resolution and/or frame rate to be increased (e.g., based on the result of an analysis by a server or other computer).

As illustrated in this example, the camera may then begin capturing a video stream with increased resolution and/or at an increased frame rate, as in 440. As described in more detail below, the camera may continue operating at the increased resolution and/or frame rate until or unless the detected condition or event no longer involves or applies to the portion of the materials handling facility that is in the field of view of the camera.

As previously noted, in some embodiments agents who are authorized to work with high-value items (and/or the equipment they use to convey the items, such as totes, pushcarts, etc.) may be required to be clothed in or tagged with a distinctive color or pattern that is designated for use by high-value-authorized agents and that can be detected from the video feed of the cameras in the video-based monitoring system. This may allow those agents who are likely to be handling high-value items to be more closely monitored than other agents working in the facility. In one example, software in the system may configured to analyze the video feed to find patch of pixels that are bigger than 30×30 and that are a particular shade of red. In this example, the video analytics may be applied to the video feed on the camera to track any red objects over a certain size. When such an object is in the field of view of any given camera, that camera's frame rate may be increased to 30 frames per and its resolution may be set to its highest level. In another example, the video-based monitoring system may be configured to apply higher-resolution monitoring for items being stowed from or picked to a bright yellow bucket than for items being stowed from or picked to a dark blue bucket. In other embodiments, agents and/or their equipment may be tagged with something that includes a specific pattern or logo and a pattern-matching function of a software library may be configured to identify and/or read them out of random video footage. In some embodiments, different colors and/or patterns on badges, clothing, and/or equipment may indicate different collections or classifications of agents, such as pickers vs. stowers, new employees vs. long-time employees, trusted employees vs. high-risk employees (e.g., those who have a probationary status or are under suspicion of violating company policy), and the resolution and/or frame rates of the video cameras in the facility may be automatically adjusted (e.g., increased or decreased) based on the detection of these different colors and/or patterns. In some embodiments, the video-based monitoring system may be configured to identify the high-value items themselves from the video streams captured by its cameras. For example, in some embodiments a high-value item may be identified in a video stream by detecting a color, a pattern, or a marking (e.g., a red "X") on a tag or wrapping applied to the item (e.g., upon receipt at the facility) that indicates that the item has been designated as a high-value item. In other embodiments, a high-value item may be identified in a video stream by detecting a logo or title visible on the image and/or by matching a portion of an image captured by the video camera with a stored image of a high-value item or a corresponding logo or title that is visible on the item. Automatically and selectively increasing resolution and/or frame rates only when high-value work is being performed and/or when circumstances warrant closer scrutiny of particular agents or operations in the facility may result in conserving bandwidth, computing resources, and/or storage resources employed on behalf of the facility.

Figure 5:
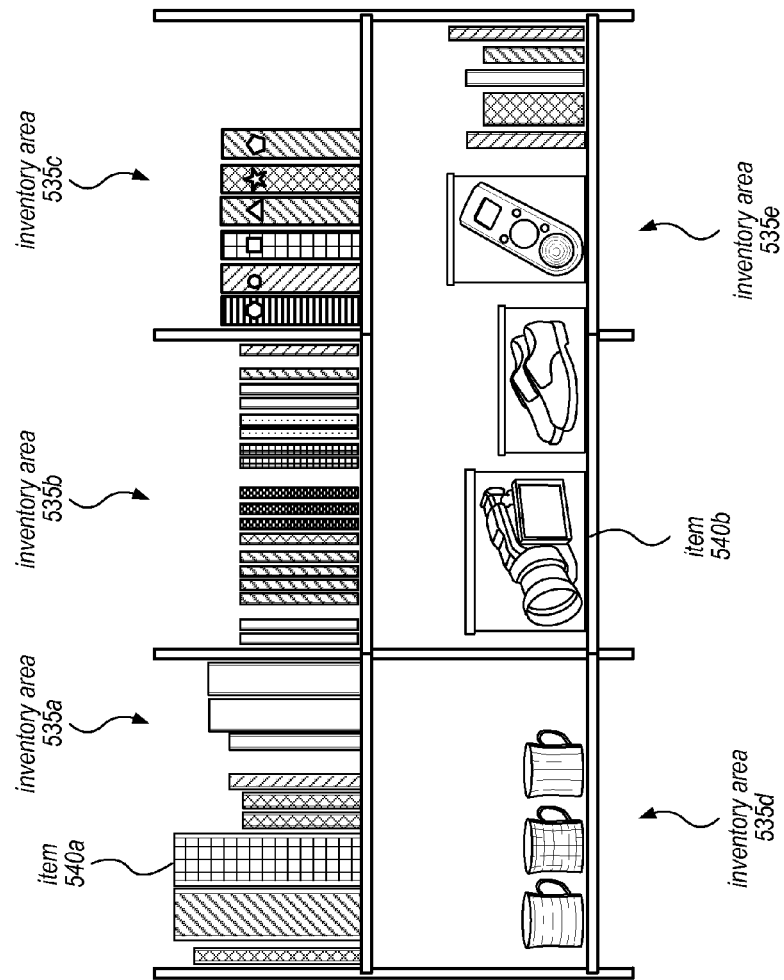
FIG. 5 illustrates a picking or stowing agent in an inventory area of a facility that employs a video-based monitoring system, according to one embodiment.
Figure 5:
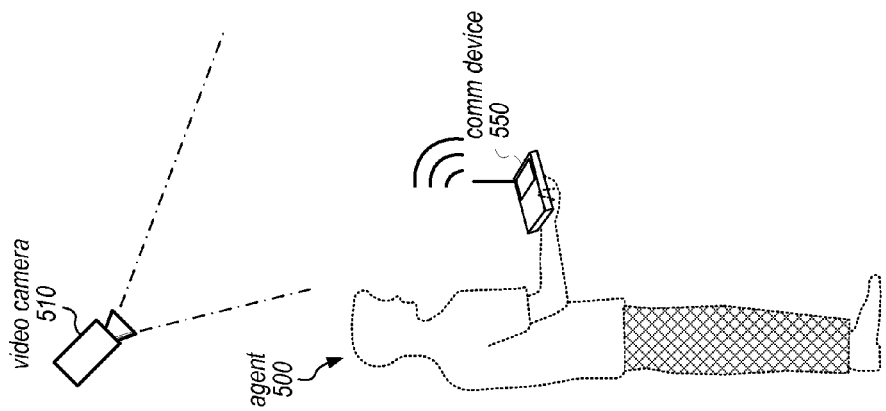

FIG. 5 illustrates a picking or stowing agent in an inventory area of a facility that employs a video-based monitoring system, according to one embodiment. As illustrated in FIG. 5, an agent may use a handheld communication device 550 to assist in a picking operation. In this example, agent 500 has been directed to a multi-shelf section of a materials handling facility to pick an item from inventory area 535a (e.g., by instructions presented to him on communication device 550). In this example, agent 500 is authorized to handle high-value items. Therefore, he is wearing pants of a particular color that is designated as indicating agents that are so authorized. This is illustrated in FIG. 5 by the hashed pattern of the pants worn by agent 500. In this example, video camera 510 is positioned such that all of inventory areas 535a-535e are in its field of view, as well as the portion of the aisle in front of these inventory areas in which agent 500 is standing. Inventory areas 535a-535e store a variety of items, some of which are considered high-value items and some of which are considered lower-value items. In this example, item 540a (a pre-release copy of a much-anticipated book) and item 540b (an expensive video camera) are considered high-value items, while the other items stored in inventory areas 535a-535e are considered lower-value items, and agent 500 has been directed to pick item 540a. A control system may have provided information (e.g., displayed on communication device 550) to guide agent 500 to inventory area 535a and to assist him in performing this picking operation. For example, the control system may have provided information to the agent indicating a shortest of preferred path to inventory area 535a from a previous location and/or to assist the agent in identifying the book once the agent reaches the area (e.g., by displaying text-based information, graphics, or photographic images on communication device 550 to help the agent locate the item and/or the inventory area in the facility). Once the agent reaches the inventory area and identifies the book, the agent may scan an identifier of the book to indicate to the control system that the item has been picked and/or to verify that the correct item was picked.

As described above, a video-based monitoring system that includes video camera 510 may be configured to scrape video captured by video camera 510 and to apply color-based analytics to the video stream to detect that an agent who is authorized to handle high-value items has entered the portion of the facility in the field of view of video camera 510. In response to detecting the presence of a high-value-authorized agent, the video-based monitoring system may be configured to increase the resolution and/or frame rate of video camera 510 while the agent at least while agent 500 remains in the field of view of video camera 510.

Note that in other embodiments, a video-based monitoring system may be configured to increase the resolution and/or frame rate of a video camera while an agent who is not authorized to handle high-value items remains in the vicinity of an inventory area that stores one or more high-value items (such as inventory areas 535a and 535e) and that is in the field of view of the corresponding video camera (in this case, video camera 510). For example, rather than detecting that an agent who is authorized to handle high-value items has entered a particular portion of the facility, the video-based monitoring system may be configured to scrape video captured by a video camera and to apply color-based analytics to the video stream to detect that an agent who is not authorized to handle high-value items has approached an inventory area that stores one or more high-value items and to more closely monitor the agent's activities while he remains in the field of view of the video camera trained on that area.

In some embodiments, in addition to color- and/or pattern-based triggers, the video-based monitoring system may support other triggers for selectively initiating higher-resolution video monitoring. For example, higher-resolution video monitoring may be triggered by detecting that an agent is loitering in a particular inventory area, whether or not the agent is assigned a task to perform in that area. For example, the system may be configured to detect motion in an aisle that includes one or more high-value items and to determine whether an agent in that aisle is authorized to handle high-value items. The system may also be able to determine whether an agent passing through an aisle on his way to an inventory area in which he has an assigned task is taking too long, whether an agent is passing though an aisle that is not on a path to his next assigned task, or whether an agent that is authorized to handle high-value items is taking too long to perform a picking or stowing operation in a particular aisle. In any of these situations, the system may be configured to increase the resolution and/or frame rate on a video camera trained on that aisle. In some embodiments, the video-based monitoring system may be configured to increase the resolution and/or frame rate of one or more video cameras in response to detecting that a condition exists in a portion of the facility under which an object with particular visual indicator is expected to be visible but that the particular visual indicator is not visible in that area. For example, if the video-based monitoring system detects motion in a portion of the facility in which high-value items are stored, or the presence of an agent or a pushcart in such an area, but no visual indicator of an authorization to handle high-value items is detected in the video stream from a video camera trained on that portion of the facility, the video monitoring system may be configured to automatically change the mode of that video camera from a default/standard resolution video mode to a higher-resolution video mode in response. In other words, the presence of an agent or pushcart in an area in which high-value items are stored that does not have a color or pattern indicating an authorization to handle such high-value items may be deemed suspicious enough to warrant closer scrutiny by the video-based monitoring system.

In some embodiments, the video-based monitoring system may be configured to increase the resolution and/or frame rate of various cameras in response to detecting (or receiving a signal indicating) various types of alarms or alerts in the materials handling facility. For example, higher-resolution video monitoring may be initiated in response to receiving a signal indicating the triggering and/or activation of a security alarm, a fire or smoke alarm, a fire sprinkler, a breakage detector, an environmental sensor (e.g., one that monitors temperature, humidity, water or air quality, or other conditions), a weather alarm, or another type of alarm or alert mechanism that indicates a condition that involves the area in the field of view of the camera (or indicates a condition that may affect the area in the field of view of the camera and/or a larger portion of the materials handling facility). In other embodiments, higher-resolution video monitoring may be initiated in response to detecting various adverse environmental conditions (e.g., smoke, fire, water, the release of a hazardous gas or another type of hazardous material) based on an analysis of the video streams captured from one or more video cameras in the facility. In still other embodiments, higher-resolution video monitoring may be initiated in response to detecting various visually detectable alarms or alerts (e.g., a stationary, blinking or pulsing visible or infrared light from an alarm or alert mechanism mounted in the facility or on a piece of equipment, from an alarm or alert mechanism on a communication device, or from an emitter on the badge of an agent) based on an analysis of the video streams captured from one or more video cameras in the facility. In any of these circumstances, higher-resolution video monitoring may capture information that is useful for determining a cause of the alarm/alert (e.g., for determining that a particular agent was in the vicinity of an alarm immediately after it was activated), or for analyzing the actions and/or behaviors of the agents in the facility in response to the alarm/alert (e.g., they may attempt to take advantage of a chaotic situation to attempt to steal one or more items from the materials handling facility). In still other embodiments, higher-resolution video monitoring may be initiated in response to an explicit request from an agent in the facility (e.g., in response to the agent activating a panic button, a medical alert button, or another type of distress signal on a handheld communication device or elsewhere in the facility). In such embodiments, the location of the agent in distress may be determined (using any of a variety of methods, including those described herein) and the resolution and/or frame rate for one or more video cameras trained on that location may be increased.

Figure 6:
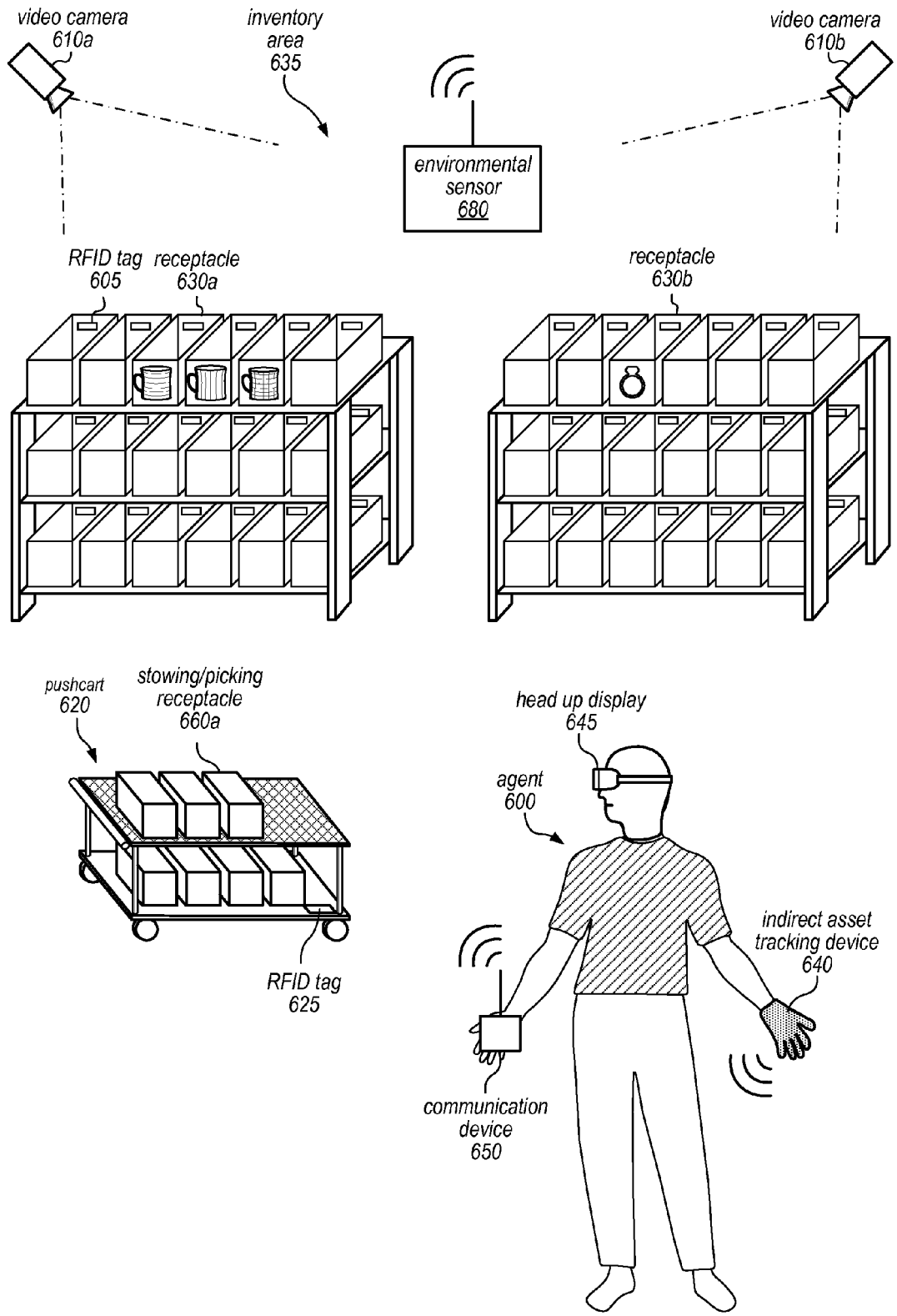
FIG. 6 illustrates a picking or stowing agent in an inventory area of a facility that employs a video-based monitoring system, according to another embodiment.

A materials handling facility may employ more than one type of communication device to facilitate picking or stowing operations, in different embodiments. FIG. 6 illustrates a picking or stowing agent in an inventory area of a materials handling facility that employs a video-based monitoring system, and several types of communication devices. In this example, an agent 600 has reached a section of an inventory area 635 containing two shelving units. Each of the shelving units includes multiple receptacles 630 (including 630*a* and 630*b*), each of which includes an RFID tag 605. In this example, receptacle 630*b* stores a high-value item (e.g., an expensive piece of jewelry), while receptacle 630*a* stores a lower-value item (e.g., a coffee mug). In this example, two video cameras of a video-based monitoring system (shown as video cameras 610*a* and 610*b*) are trained on different portions of inventory area 635 such that the collective field of view of the two cameras encompasses all of inventory area 635 and the aisle in which agent 600 and pushcart 620 are located.

As illustrated in FIG. 6, an environmental sensor 680 (which in various embodiments may communicate with a control system and/or other components of the materials handling facility through a wired connection or wirelessly) is present in inventory area 635. Environmental sensor 680 may be configured to detect high temperature or humidity, a decrease in water or air quality, the presence of harmful gasses of other substances, or other undesirable environmental conditions and to alert agents in inventory area 635 (or in the vicinity thereof), a control system of the materials handling facility, and/or various security or safety personnel of the materials handling facility in the event that the undesirable environmental condition has been detected. In some embodiments, in response to such detection, the resolution and/or frame rate of video camera 610*a* and/or video camera 610*b* may be increased. For example, the video-based monitoring system (e.g., one of cameras 610*a* or 610*b*, or a control portion of the video-based monitoring system) may be configured to detect the alert or receive a signal from the sensor indicating the reason for the alert, or a control system may detect the alert or receive a signal from the sensor indicating the alert. The video-based monitoring system (or a control portion thereof) may send instructions to one or more cameras to initiate an increase in the resolution and/or frame rate of the cameras in order to more closely monitor the situation and/or provide data for determining a cause of or a response to the alert. In other embodiments, similar processes may be applied in response to detecting (or receiving a signal indicating) a different type of alarm or alert signal. Note that the response to an alarm or alert may be a local response (e.g., an adjustment of the resolution and/or frame rate only for video cameras in the area in which the alarm/alert was triggered) or may be a global response (e.g., an adjustment of the resolution and/or frame rate for all video cameras in the facility), depending on the type of the alarm/alert and/or the scope of the event or condition that triggered it.

As illustrated in this example, an agent 600 may carry a communication device 650, which may in some embodiments be the same as, or similar to, other such handheld communication devices described herein (e.g., communication device 550 in FIG. 5). Communication device 650 may be configured to receive picking or stowing instructions from a control system; to direct agent 600 to inventory area 635; to scan, enter, or record information about a picked or stowed item; or to request and/or present additional information to agent 600 to help the agent locate an item or a particular storage receptacle 630, in different embodiments. As illustrated in FIG. 6, agent 600 may in some embodiments use a head-mounted display device (also known as a "head up" display) as a communication device, and this device may be configured for hands-free control. Such a display device may be configured to receive and display picking or stowing instructions, to direct agent 600 to inventory area 635, or to provide additional information to agent 600 to help the agent locate an item or a particular storage receptacle 630, in different embodiments. In other words, some or all of the information presented to agent 600 to assist him in a picking or stowing operation may be presented using head up display 645 instead of or in addition to using a handheld communication device 650. In other embodiments, other types of head up display devices may be used (e.g., one implemented as a monocle on a headset or helmet). In some embodiments, rather than using a computer-based communication device (e.g., a head up display or handheld communication device) to present picking or stowing instructions to an agent, printed pick lists or stowing instructions may be provided to an agent. In other embodiments, printed instructions may be used in conjunction with one or more computer-based communication devices to assist an agent in performing various operations in the materials handling facility.

In this example, agent 600 has a pushcart 620 on which multiple receptacles 660 (including receptacle 660a) are situated. In this example, pushcart 620 includes an RFID tag 625. In some embodiments, a communication device 650 may determine the location of agent 600, e.g., by detecting one or more RFID tags 605 on receptacles 630 (e.g., receptacle 630a or 630b) in inventory area 635. In other embodiments, the location of agent 600 may be determined by sensing the location of a global positioning system (GPS) device located on the agent or the pushcart, by triangulation of radio signals, by scraping and analyzing a video stream captured by video camera 610a or video camera 610b, or by other means. This location information may be communicated to a control system, which may in turn communicate with communication device 650 (e.g., wirelessly) to cause it to display picking or stowing instructions for agent 600. In this example, each RFID tag in the materials handling facility may include a unique identifier that uniquely identifies the RFID tag at least within the materials handling facility (or within a portion thereof). The location of each receptacle or other asset within a materials handling facility to which an RFID tag is attached, and/or other information relevant to the receptacle or other equipment to which the RFID tag is attached, may be associated with the unique identifier of the RFID tag and stored such that it is accessible by a control system in the facility. Agents within the materials handling facility may be equipped with RFID readers, which may be integrated in or attached to gloves, wristbands, or other devices (e.g., indirect asset tracking device 640) worn or carried by agents. In such embodiments, when an agent's hand approaches an inventory area equipped with an RFID tag or enters a receptacle equipped with an RFID tag, the RFID reader may detect the presence of the agent's RFID tag and may activate and receive signals from the RFID tags within its range. This information, in combination with known information such as the location of the receptacles 630, may be used, for example, in verifying that a correct item is picked or that an item is stowed in the correct receptacle, or in determining a current location of the agent within the facility (e.g., by calibrating the location of the agent to known reference points within the facility). In another embodiment, an indirect assert tracking device may be mounted on an agent's pushcart 620, rather than being worn or carried by agent 600.

As described above, in some embodiments, the video-based monitoring system may be configured to determine whether an agent in the field of view of cameras 610a and/or 610b is (or is not) an agent authorized to handle high-value items in the materials handling facility and to adjust the resolution and/or frame rate of the video cameras 610 accordingly. In the example illustrated in FIG. 6, such a determination may be made based on detecting whether agent 620 is wearing a particular color, or that his pushcart 620 is a particular color. In some embodiments, an agent's RFID tag may indicate whether or not he is authorized to handle high-value items. In response to determining that agent 600 is authorized to handle high-value items (based on detecting the color represented by the hash pattern on his shirt or the hash pattern on the top of the pushcart in a video stream from camera 610a or from camera 610b), the video-based monitoring system may be configured to increase the resolution and/or frame rate for one or both of the cameras 610a and 610b while agent 600 is in a respective field of view.

Figure 7:
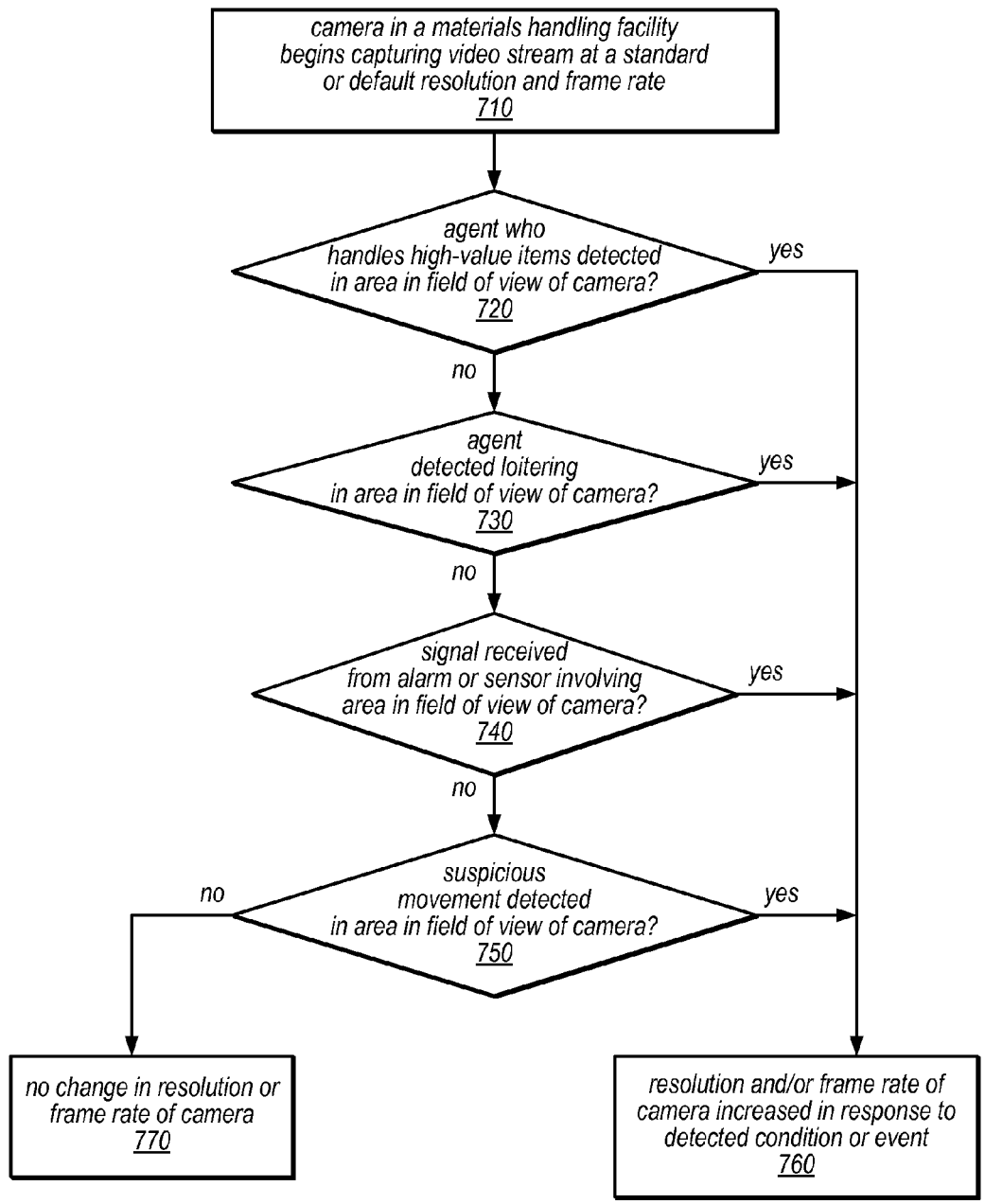
FIG. 7 is a flow diagram illustrating one embodiment of a method for determining whether to increase the resolution and/or frame rate of a given camera in a materials handling facility.

One embodiment of a method for determining whether to increase the resolution and/or frame rate of a given camera in a materials handling facility is illustrated by the flow diagram in FIG. 7. As illustrated in this example, a variety of conditions and/or event types may trigger an adjustment to the resolution and/or frame rate of a given video camera that is one of multiple video camera employed by a video-based monitoring system, in different embodiments. As illustrated in FIG. 7, the method may include a camera in a materials handling facility beginning to capture a video stream at a standard or default resolution and frame rate (e.g., a relatively low resolution and a relatively low frame rate), as in 710. If an agent who is authorized to handle high-value items is detected in an area that is in the field of view of the camera (shown as the positive exit from 720), the method may include increasing the resolution and/or frame rate of the camera in response to detecting this condition (as in 760). For example, it may be determined (using analytics performed on the video camera itself or analytics applied by a server or other computer that is employed by the video-based monitoring system and that receives and analyzes a video stream) that an agent is wearing a badge or an article of clothing with a particular color or pattern designated for wear by agents who are authorized to handle high-value items (e.g., a blue checkered shirt, yellow striped pants, or a red beret) or that the agent is pushing a cart, carrying a communication device, or carrying a tote with a particular color or pattern designated for use by agents who are authorized to handle high-value items. In response to detecting the designated color or pattern in the video stream, the camera may be configured to increase its own resolution and/or frame rate, or the control system may provide instructions to the camera to cause the resolution and/or frame rate to be increased (e.g., based on the result of an analysis by a server or other computer employed by the video-based monitoring system).

Note that when his presence is detected, the high-value-authorized agent may be handling a high-value item in the area in the field of view of the camera (e.g., picking or stowing a high-value item), may be handling a lower-value item in the area in the field of view of the camera, or may be merely passing through the field of view of the camera on a path through the facility to reach another portion of the facility (e.g., to perform a picking or stowing operation, to deliver picked items to a sorting station, to retrieve addition items to be stowed, or to perform another other operation). However, in this example (e.g., due to a policy of the materials handling facility), the presence of the high-value-authorized agent in the area in the field of view of the camera may be sufficient to warrant increasing the resolution and/or frame rate of the camera, whether or not the agent has an assigned task to perform in that area. In other embodiments, a policy of the materials handling facility may specify that the mere presence of the high-value-authorized agent in the area in the field of view of the camera is not sufficient to warrant increasing the resolution and/or frame rate of the camera. In some such embodiments, the resolution and/or frame rate of the camera may only be increased if the high-value-authorized agent is performing a picking or stowing operation in the area, is handling a high-value item in the area, or has spent more time than required in the area (whether or not he is supposed to be handling items in that area).

As illustrated in this example, if no high-value-authorized agent is detected in the field of view of the camera (shown as the negative exit from 720), but an agent is detected loitering in the area in the field of view of the camera (shown as the positive exit from 730), the method may include increasing the resolution and/or frame rate of the camera in response to detecting this condition (as in 760). In other words, if it is determined (e.g., using information scraped from a video stream or other types of information) that an agent has spent more time in the area than is required to perform an assigned operation in the area or that an agent has spent a significant amount of time in an area in which has no assigned tasks, the camera may be configured to increase its own resolution and/or frame rate (based on its own analytics), or the control system may provide instructions to the camera to cause the resolution and/or frame rate to be increased (e.g., based on the result of an analysis by a server or other computer employed by the video-based monitoring system). Again, different materials handling facilities may employ different policies about how loitering is defined and at what point increased scrutiny through increased video resolution and/or frame rate is warranted.

In the example illustrated in FIG. 7, if no agent is detected loitering in the area in the field of view of the camera (shown as the negative exit from 730), but a signal is received by the video-based monitoring system (or a component thereof) from an alarm or sensor involving (or affecting) the area in the field of view of the camera (shown as the positive exit from 740), the method may include increasing the resolution and/or frame rate of the camera in response to detecting this condition (as in 760). For example, in some embodiments the video-based monitoring system may receive a signal indicating that a security alarm, a fire or smoke alarm, a breakage detector, an environmental sensor (e.g., one that monitors temperature, humidity, water or air quality, or other conditions), a weather alarm, or another type of alarm or alert mechanism indicates a condition that involves the area in the field of view of the camera (or indicates a condition that may affect the area in the field of view of the camera and/or a larger portion of the materials handling facility). In response, the control system may provide instructions to the camera to cause the resolution and/or frame rate to be increased (e.g., based on the receipt of an alarm/alert signal by a server or other computer employed by the video-based monitoring system).

As illustrated in FIG. 7, if no alarm or alert involving (or affecting) the area in the field of view of the camera is detected (shown as the negative exit from 740), but a suspicious movement is detected in the area in the field of view of the camera (shown as 750), the method may include increasing the resolution and/or frame rate of the camera in response to detecting this condition (as in 760). For example, in some embodiments the video-based monitoring system (or a camera thereof) may be configured to analyze video input and detect that an agent is moving backward through an entry or exit point, that an agent is moving erratically or not at all, or that an agent is performing a pre-defined warning or trouble-alert gesture to indicate that he needs help due to a medical, safety, or security issue (e.g., raising his hands, waving his arms, or placing his hands in a particular position or pose). In some such embodiments, particular movements or gestures may indicate that the agent requires the assistance of medical personnel, security personnel, or safety personal (e.g., to deal with a hazardous material in the facility). In response, the camera may be configured to increase its own resolution and/or frame rate (based on its own analytics), or the control system may provide instructions to the camera to cause the resolution and/or frame rate to be increased (e.g., based on the receipt of an alarm/alert signal by a server or other computer employed by the video-based monitoring system).

In the example illustrated in FIG. 7, the operations illustrated in 720-750 for detecting conditions or event that may warrant higher-resolution video monitoring by a cameras in a materials handling facility may be repeated (e.g., continuously) to determine when and if the resolution and/or frame rate of the camera should be increased (not shown). However, as long as none of the conditions or events described in 720-750, there may be no change in the resolution or frame rate of the camera (shown at 770).

Figure 8:
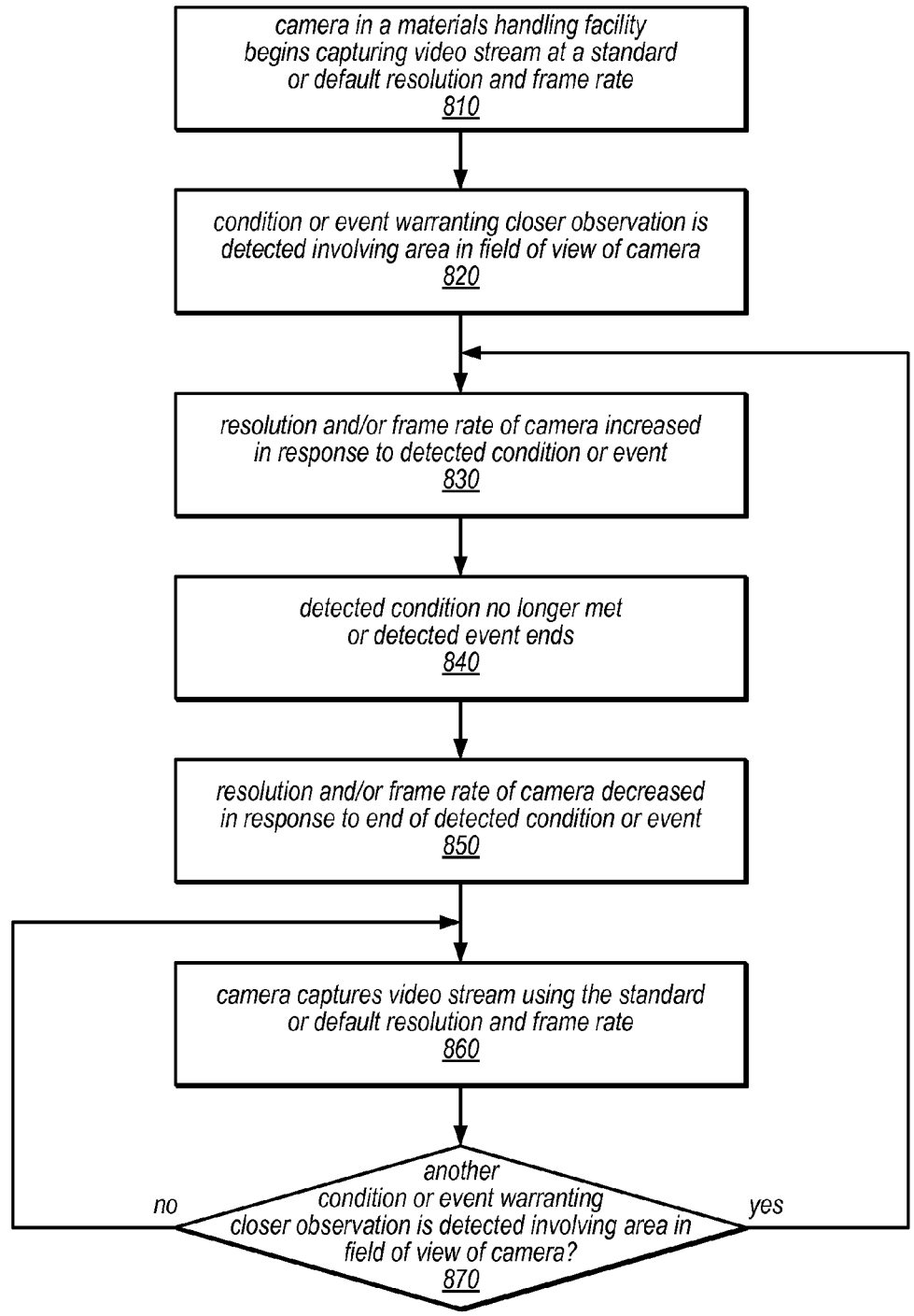
FIG. 8 is a flow diagram illustrating one embodiment of a method for dynamically adjusting the resolution and/or frame rate of a given camera in a materials handling facility.

In some embodiments, the resolution and/or frame rate of a given one of multiple cameras in a video-based monitoring system may be adjusted over time as conditions change or as various events occur. One embodiment of a method for dynamically adjusting the resolution and/or frame rate of a given camera in a materials handling facility is illustrated in FIG. 8. As in previous examples, the method may include a camera in the materials handling facility beginning to capture a video stream at a standard or default resolution and frame rate (e.g., a relatively low resolution and a relatively low frame rate), as in 810. A condition or event warranting closer observation may be detected involving area in the field of view of the camera (as in 820), and the resolution and/or frame rate of the camera may be increased in response to the detected condition or event (as in 830). For example, the resolution and/or frame rate may be automatically increased in response to detecting a pre-defined condition or event based on camera analytics or in response to receiving instructions to do so from a control system. Such instructions may be based on an indication from a server or other computer employed by the video-based monitoring system that higher-resolution video monitoring is warranted (e.g., a server or other computer that received and analyzed a video stream or that received an alarm/alert signal, as described herein).

As illustrated in this example, once the detected condition is no longer met or when the detected event ends (shown as 840), the resolution and/or frame rate of the camera may be automatically decreased in response (as in 850). For example, if the resolution or frame rate of the camera was increased from an initial default or standard level in response to detecting that a high-value-authorized agent was present in the area in the field of view of the camera (e.g., using analytics of the camera or a server to determine that clothing or equipment with a designated color or pattern is in the area), it may be decreased (e.g., back to the initial, lower default or standard level) in response to determining that the agent has left the area (e.g., using analytics of the camera or the server to determine that no clothing or equipment with the designated color or pattern is in the area). In another example, if the resolution or frame rate of the camera was increased in response to receiving a signal that an alarm or alert was triggered that involves or affects the area in the field of view of the camera, it may be decreased (e.g., it may be set back to the lower default or standard level by the camera itself or by instructions received from a control system) in response to determining that the alarm or alert has been cancelled. The camera may then resume capturing a video stream using the standard or default resolution and frame rate (as in 860).

As illustrated in this example, the method may be repeated (e.g., continuously) to dynamically adjust the resolution and/or frame rate in response to changing conditions. For example, if one or more other conditions or events warranting closer observation is detected involving (or affecting) the area in the field of view of the camera (shown as the positive exit from 870), the operations illustrated at 830-860 may be repeated in response to detecting each of those conditions or events. However, while no other conditions or events that warrant closer observation involve or affect the area in the field of view of the camera (shown as the negative exit from 870), the camera may continue capturing a video stream using the standard or default resolution and frame rate. This is illustrated in FIG. 8 as the feedback from the negative exit of 870 to 860.

In some embodiments, as a picking or stowing agent who is authorized to handle high-value items traverses the facility, the video-based monitoring system (or a control component thereof) may track the location of the agent as the agent moves within the facility using various methods. In some embodiments fixed-location cameras or scanners may be used to determine and/or track the location of the agent and/or the agent's pushcart as they traverse the facility. For example, in one embodiment a camera or scanner at a fixed location may be configured to use face, color, or pattern recognition to determine an agent's location (e.g., by scraping video data to determine a visually distinguishable indicator such as a particular flag, tag, color, pattern, mark or other identifier of the agent and/or his authorization to handle high-value items on a hat, badge, shoulder strap, pushcart, etc., or to detect a designated color or pattern in an article of clothing, a device, or a piece of equipment used by the agent). In various embodiments, different combinations of fixed-location devices (e.g., scanners and/or cameras mounted at fixed locations within a facility) and mobile devices (e.g., scanners, and/or cameras carried or mounted on movable components within the facility) may be used in conjunction with various markers, RFID tags, or other identifiers of agents, items, pushcarts, and/or inventory areas to determine and track the location, position and/or orientation of agents and pushcarts (or other containers used to transport items) within the facility. In some embodiments, an agent, item, device, or piece of equipment may have an emitter that emits visible or infrared light that can be detected by the video-based monitoring system. The pattern of light pulses emitted by such a device may identify an item as a high-value item, may identify that an agent, device, or piece of equipment is designated and/or authorized for operations involving high-value items and/or may identify an individual agent. A control system may use any or all of this information to present instructions to the agent that are in the context of the agent's current location. In addition, when the presence of an agent that is authorized to handle high-value items is detected as the agent moves within the facility (using these and/or other methods), the resolution and/or frame rate of the video cameras trained on the areas in which the agent presence is detected may be increased while the agent remains in the field of view.

Figure 9:
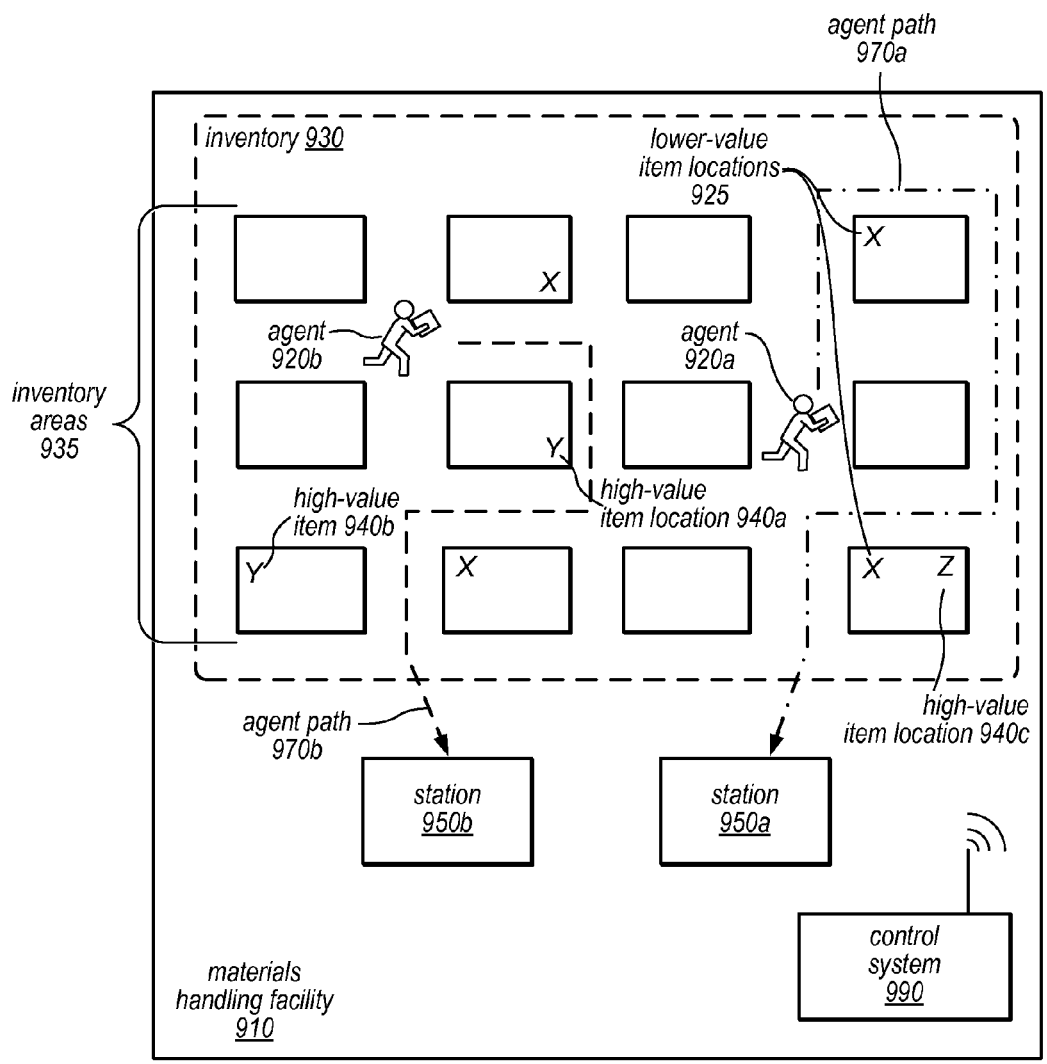
FIG. 9 is a block diagram illustrating multiple agents traversing a portion of a materials handling facility, according to one embodiment.

As described above, multiple picking agents may be picking items at the same time in a materials handling facility and, for some orders, no single agent may pick all the items for a single order. Instead, in some embodiments, each of several agents may pick one or more items for an order and transfer those items to a sorting station, and information may be provided to each agent to aid in locating items within the inventory areas. FIG. 9 is a block diagram illustrating multiple agents traversing a portion of a materials handling facility, according to one embodiment. More specifically, FIG. 9 illustrates the paths of two agents 920a and 920b in a materials handling facility 910 who are picking items and transporting them to stations 950a and 950b, respectively. In this example, control system 990 may be configured to determine the current locations of each of the agents 920 (using any of a variety of methods, including those described herein) and to determine the shortest (or preferred) path for each of them through inventory 930 in order to pick items in fulfillment of one or more customer orders. In some embodiments, control system 990 may be configured to determine paths for each of the agents 920 so that they do not cross each other, or so that the agents 920 will not be directed to the same inventory area or aisle at the same time.

In the example illustrated in FIG. 9, once control system 990 determines a path for each of the agents 920, the agents are directed to different inventory areas in order to pick items from various item locations 925. In the example illustrated in FIG. 9, agent 920a is directed to follow path 970a, picking up two lower-value items (marked by Xs in FIG. 9) from two locations 925 and delivering them to station 950a for further processing. Agent 920b is directed to follow path 970b, picking two lower-value items from other item locations 925 (marked by Xs in FIG. 9) and one high-value item (marked with a Y in FIG. 9) from location 940a, and delivering them to station 950b for further processing. As illustrated, each of the agents 920 is carrying a communication device, which may be used to display information for identifying and/or locating individual items at item locations 925 (e.g., location, position and/or descriptive information received from control system 990), or which may be used to scan an identifier of an item when picked, in different embodiments.

In the example illustrated in FIG. 9, agent 920b may be authorized to handle high-value items (such as those marked by Ys and stored in locations 940a and 940b). Agent 920b may wear an article of clothing of a particular color designated for agents who are so authorized, or may employ a pushcart, tote or other means of conveyance of a particular to transport items that include high-value items. In some embodiments, each of multiple video cameras installed in inventory 930 as part of a video-based monitoring system (not shown) may operate using a default or standard resolution and frame rate until or unless the system detects the presence of an agent authorized to handle high-value items (such as agent 920b) in the field of view of one or more of the video cameras (e.g., based on the particular color that indicates high-valueauthorized agent or by other means). In response to detecting the presence of an agent authorized to handle high-value items, the resolution and/or frame rate for the corresponding video camera(s) may be increased at least while the agent remains within the view area of the video camera(s). Note that as agent 920b traverses the facility, different ones of the video cameras in the facility may operate with an increased resolution and/or frame rate at different times, as agent 920a moves into and then out of the field of view of various video cameras. In this way, the video-based monitoring system may track the movement of agent 920b using multiple video cameras, and may employ closer monitoring of his actions by those cameras than is employed to monitor other agents and/or actions in the facility only when it is warranted by his presence.

In the example illustrated in FIG. 9, agent 920a may not be authorized to handle high-value items. In some embodiments, unless agent 920a is detected in an aisle that is not on path 970a and that includes a high-value item location 940a, or is detected loitering in an aisle that is on path 970a and includes a high-value item (marked by a Z in FIG. 9) in location 940c, the resolution and frame rate of any video cameras trained on the inventory areas in which agent 920a handles items and/or the aisles through which agent 920a passes may remain at the default or standard levels.

Figure 10:
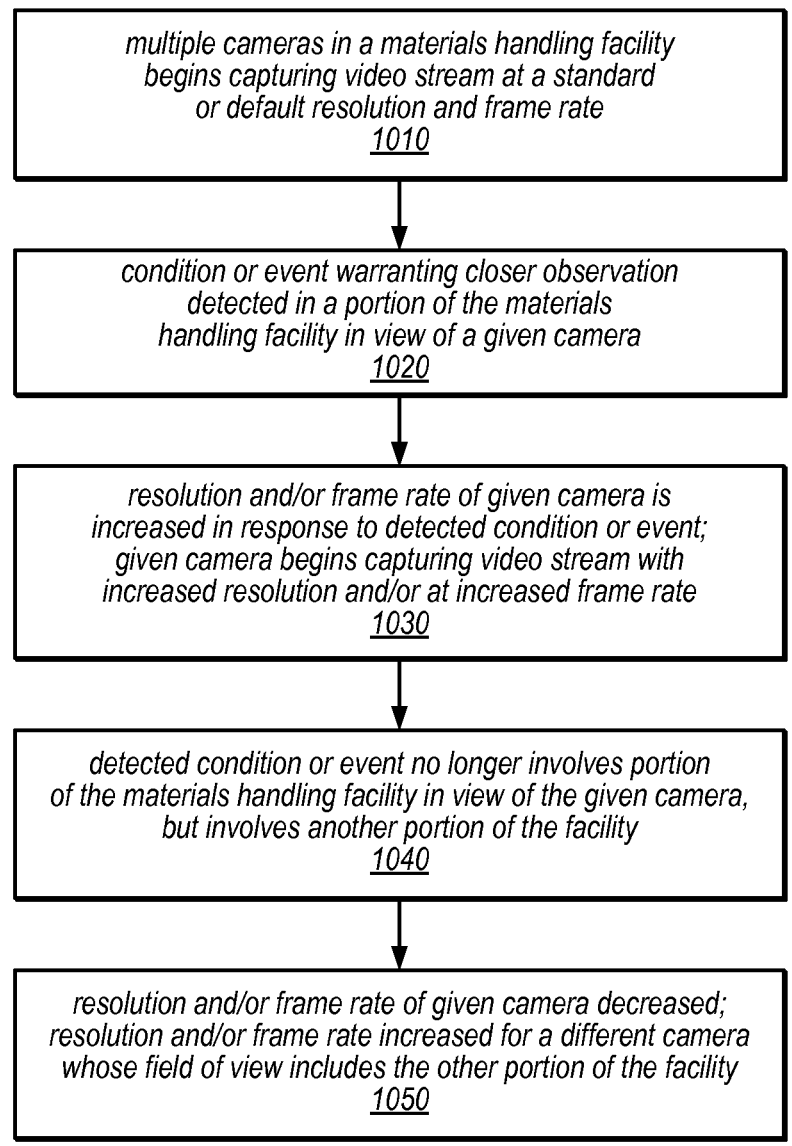
FIG. 10 is a flow diagram illustrating one embodiment of a method for using high-resolution video to monitor different portions of a materials handling facility in response to changing conditions or events.

One embodiment of a method for using high-resolution video to monitor different portions of a materials handling facility in response to changing conditions or events is illustrated by the flow diagram in FIG. 10. As illustrated in this example, the method may include multiple cameras of a video-based monitoring system in a materials handling facility beginning to capture video streams at a standard or default resolution and frame rate (e.g., a relatively low resolution and a relatively low frame rate), as in 1010. A condition or event warranting closer observation may be detected involving area in the field of view of a given one of the cameras (as in 1020), and the resolution and/or frame rate of the given camera may be increased in response to the detected condition or event (as in 1030). For example, the resolution and/or frame rate may be automatically increased in response to detecting a predefined condition or event based on camera analytics or in response to receiving instructions to do so from a control system. Such instructions may be based on an indication from a server or other computer employed by the video-based monitoring system that higher-resolution video monitoring is warranted (e.g., a server or other computer that received and analyzed a video stream or that received an alarm/alert signal, as described herein). Thereafter, the given camera may begin capturing a video stream with the increased resolution and/or at an increased frame rate.

As illustrated in this example, at some point subsequent to increasing the resolution and/or frame rate, the detected condition may no longer involve or affect the portion of the materials handling facility in the field of view of the given camera, but may involve or affect another portion of the facility (as shown at 1040). For example, the resolution or frame rate of the given camera may have been increased in response to detecting that a high-value-authorized agent was present in the area in the field of view of the given camera (e.g., using analytics of the camera or a server to determine that clothing or equipment with a designated color or pattern was in the area), and the agent may have moved out of the field of view of the given camera and into the field of view of another camera in the video-based monitoring system. In some embodiments, the movement of the agent between locations within the materials handling facility may be tracked by the video-based monitoring system using the analytics of the cameras or a server that detect clothing or equipment with a designated color or pattern in the video streams it receives. In another example, the resolution or frame rate of the camera may have been increased in response to detecting that an agent was loitering in the area in the field of view of the given camera or in response to detecting a suspicious movement of an agent in the area in the field of view of the given camera. In some embodiments, that agent moves to another portion of the facility that is monitored using a different one of the cameras of the video monitoring system.

In this example, subsequent to (and/or in response to) determining that the detected condition no longer involves or affects the portion of the materials handling facility in the field of view of the given camera, but that it involves or affects another portion of the facility, the resolution and/or frame rate of the given camera may be automatically decreased (e.g., it may be set back to the lower default or standard level by the camera itself or by instructions received from a control system), as in 1050, at which point the given camera may resume capturing a video stream using the standard or default resolution and frame rate. In addition, the resolution and/or frame rate may be increased for a different camera whose field of view includes the other portion of the facility.

Note that the method illustrated in FIG. 10 and described above may be repeated (e.g., continuously) to dynamically adjust the resolution and/or frame rate of various cameras of the video-based monitoring system in response to changing conditions in different portions of the facility (note shown). For example, the video-based monitoring system may be configured to "follow" an agent, an event, or a condition as it migrates between different portions of the facility, dynamically adjusting the parameters of the video cameras so that areas involved in or affected by a condition or event that warrants closer scrutiny are monitored more closely while areas that are not involved in or affected by such conditions or events are monitored using the default or standard resolution and frame rate. While the flow diagram in FIG. 10 illustrates a case in which a video-based monitoring system responds to a condition or event that migrates from one location to another, in some embodiments, the video-based monitoring system may also be configured to respond to situations in which a condition or event spreads from one (or a small number) of areas in the facility to a wider portion of the facility. For example, in some embodiments if the resolution or frame rate of a given camera was increased in response to detecting or receiving an indication of an environmental alarm or alert (e.g., one indicating an elevated temperature or a problem with the air quality in the facility), and if this condition spreads to other portions of the facility, the video-based monitoring system may be configured to increase the resolution and/or frame rate for additional cameras in the facility without decreasing the resolution and/or frame rate of the given camera. In other embodiments, certain types of alarms or alerts (e.g., those likely to impact the entire facility, such as a fire alarm) may trigger the video-based monitoring system to increase the resolution and/or frame rate of all of the video cameras in the facility in order to capture higher-resolution video information that may be useful for determining a cause of the alarm/alert or for analyzing the actions and/or behaviors of the agents in the facility in response to the alarm/alert.

In some embodiments, the resolution and/or frame rate of one or more video cameras trained on respective portions of the facility that are adjacent to the portion of the facility in which a condition warranting high-resolution video monitoring was detected may be preemptively increased so that these video cameras may begin capturing high-resolution video in areas in which the condition is likely to be satisfied in the near future (i.e., in anticipation of the condition being satisfied in those areas soon). This may allow the video-based monitoring system to capture the transition to a state in which the condition is satisfied in those portions of the facility using high-resolution video monitoring. In some such embodiments, if the direction in which an agent, pushcart or high-value item that is being monitored using high-resolution video is travelling is known or can be determined (or predicted) based on the video streams captured by the video cameras in the facility, the control system may be configured to preemptively adjust the resolution and/or frame rates of the video cameras in the areas in which the agent, pushcart or high-value item is expected to appear. In some embodiments, the video-based monitoring system may be configured to determine (e.g., dependent on the video stream captured by a particular camera) that the particular camera has been damaged, moved or repositioned in the materials handling facility. In response, the video-based monitoring system may be configured to increase the resolution and/or frame rate of one or more other video cameras nearby (e.g., video cameras whose field of view overlaps the previous field of view of the damaged, moved or repositioned camera or whose field of view is immediately adjacent to the previous field of view of the damaged, moved or repositioned camera). For example, the video-based monitoring system may be configured to determine that a video camera has been moved or repositioned by detecting (based on the video stream captured by the camera) that the field of view has changed (e.g., that it has changed by a least a pre-defined threshold amount). In some embodiments, the video-based monitoring system may also be configured to activate an alarm or alert to indicate (e.g., to a security or maintenance function) that the camera has been damaged, moved or repositioned.

Although many of the examples described herein involve the use of a video-based monitoring system in picking and/or stowing operations of a materials handling facility, a video-based monitoring system may also be used in other operations within the facility. For example, high-resolution video monitoring may be automatically initiated in response to determining that an agent who is authorized to handle high-value items is working in a sorting or packing operation, or in response to detecting a malfunction of the sortation or packing equipment (e.g., in order to closely monitor the effects of the malfunction or determine whether an agent was in the vicinity of the equipment near the time of the malfunction). In another example, high-resolution video monitoring may be automatically initiated in a receiving operation in response to determining that a shipment of high-value items has been received, in response to detecting that an agent who is authorized to handle high-value items is working in the receiving operation, or in response to detecting a security breach at an entrance to the facility. In yet another example, high-resolution video monitoring may be automatically initiated in a receiving operation in response to detecting that a received item is damaged upon receipt or may be initiated in response to detecting that an agent activated an alarm or alert (e.g., a visual alarm/alert or another type of alarm/alert signal) upon receipt of a damaged item. In this example, once such an alarm/alert is activated by the agent, it may remain active only for a short time (e.g., just long enough to trigger and perform a high-resolution video recording documenting the condition of the damaged item upon receipt), and this recording may be useful in attempting to back-charge the vendor for the damaged item.

A video-based monitoring system, as described herein, may be utilized in a number of different facilities and situations, including, but not limited to material handling facilities, order fulfillment centers, rental centers, distribution centers, packaging facilities, shipping facilities, libraries, museums, warehouse storage facilities, shopping centers, grocery stores, car parking lots, etc., or in general in any large facility in which a need for high-resolution video monitoring is not continuous and absolute, but may be dependent on certain conditions or events.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of the control system, product database, display devices, and/or other communication devices).

Figure 11:
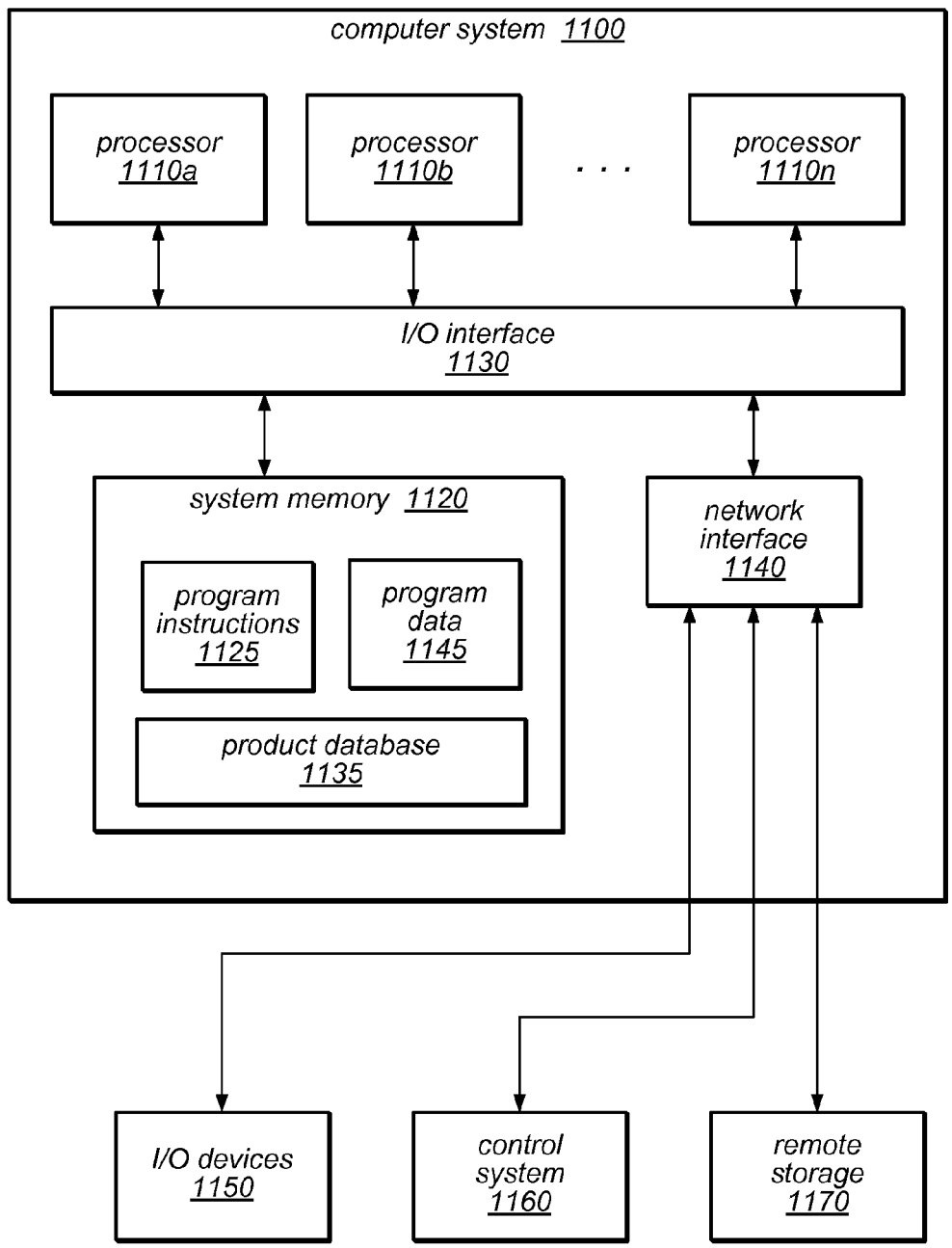
FIG. 11 is a block diagram illustrating a computer system that implements at least a portion of a video-based monitoring system in a materials handling facility, according to one embodiment.

Any of various computer systems may be configured to implement the video-based monitoring system and methods described herein, in different embodiments. For example, in one embodiment the video-based monitoring system may be implemented using multiple network-enabled video cameras and corresponding servers, while in another embodiment, the video-based monitoring system may be implemented using multiple USB-enabled video cameras and one or more personal computer systems. FIG. 11 is a block diagram illustrating one embodiment of a computer system that implements at least a portion of a video-based monitoring system in a materials handling facility. For example, in various embodiments, an order fulfillment control system (such as control system 990 of FIG. 9), a video-based monitoring system (or control portion thereof), a video camera of a video-based monitoring system, or a communication device (e.g., communication device 550 illustrated in FIG. 5 or communication device 650 illustrated in FIG. 6) may each include a general-purpose computer system such as computer system 1100 illustrated in FIG. 11. In other words, in various embodiments, computer system 1100 may represent a computer system of a video camera that performs the analytics described herein and/or automatically adjusts its resolution and/or frame rate accordingly, or may represent a computer system that implements a server that receives video streams and other information (e.g., signals indicating various alarms or alerts), and performs the analytics and/or control operations of the video-based monitoring system described herein (including, for example, dynamically adjusting the resolution and/or frame rates of various video cameras in response to changing conditions and/or events in the materials handling facility).

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of a video-based monitoring system, an order fulfillment control system, a communication device, or a video camera of a video-based monitoring system, while in other embodiments a video-based monitoring system, an order fulfillment control system, a communication device, or a video camera of a video-based monitoring system may include more, fewer, or different elements than those of computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for implementing a video-based monitoring system, an order fulfillment control system, a communication device, or a video camera of a video-based monitoring system, are shown stored within system memory 1120 as program instructions 1125. In some embodiments, system memory 1120 may include product database 1135, which may be configured as described herein. In other embodiments, remote storage 1170 may include a product database instead of, or in addition to, system memory 1120. For example, the information described herein as being stored in a product database may be partitioned between a database included in system memory 1120 and one or more databases included on one or more remote storage devices 1170, in various embodiments. In some embodiments, system memory 1120 (e.g., program data 1145 within system memory 1120) and/or remote storage 1170 may store policy information specifying the conditions and/or events that trigger higher-resolution video monitoring, as described herein. System memory 1120 (e.g., program data 1145 within system memory 1120) and/or remote storage 1170 may also store video streams captured by one or more video cameras of a video-based monitoring system, in different embodiments. For example, in one embodiment video stream data may be resident within system memory 1120 while it is actively being analyzed by program instructions 1125, and may be copied or moved to remote storage 1170 subsequent to active analysis, according to various policies for retention and/or archiving of the video footage.

For example, in some embodiments, all video footage captured by the video-based monitoring system (whether captured using the default/standard resolution and frame rate or an increased resolution and/or frame rate) may be retained (e.g., in remote storage 1170) for at least a pre-defined short period of time (e.g., on the order of days or weeks), while some of the video footage (e.g., video footage captured using an increased resolution and/or frame rate) may be retained for a pre-defined longer period of time (e.g., on the order of weeks or months) in order to determine the cause of the conditions that triggered high-resolution video monitoring and/or analyze the responses to those conditions. In some embodiments, at least a portion of the video footage may be designated for permanent archiving, such as when the video footage documents situations in the facility that are more likely to result in some type of legal proceeding (e.g., situations involving an accident or injury, workplace violence, a fire, or exposure to hazardous materials) than those that can be resolved following an internal investigation (e.g., situations involving simple theft or relatively minor property damage). In some embodiments, upon detection of any condition or event for which high-resolution video monitoring is warranted, the control system may be configured to automatically modify a retention parameter for the corresponding video footage so that it is retain at least long enough to be examined by safety, security, maintenance, and/or human resources operations. If the detected condition or event was one likely to lead to a more extensive investigation or legal proceedings, the control system may be configured to automatically modify a retention parameter to indicate that the footage be retained for a longer period of time and/or permanently archived. In different embodiments, the automatic designation of a retention parameter may or may not be overridden by an employee (e.g., an employee in an administrative or executive position), according to applicable policies. In some embodiments, video footage stored in remote storage 1170 (or portions thereof) may be associated with various items that are handled in the materials handling facility in a product database (e.g., as an element of the history of the product). In such embodiments, video footage that records the handling of an item (e.g., during receiving picking, stowing, sorting, or packing) may be useful in determining the source of any damage to the item (e.g., for quality assurance and/or warrantee functions of the facility).

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems, for example. In particular, network interface 1140 may be configured to allow communication between computer system 1100 and various I/O devices 1150, control system 1160, and/or remote storage 1170. I/O devices 1150 may include a video capture component, one or more video cameras of a video-based monitoring system and/or various communication devices, such as those described herein. In some embodiments, each of the video cameras may include one or more processors, a video capture component, and memory storing program instructions executable on the one or more processors to implement the methods described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a non-transitory computer-accessible medium configured to store program instructions and data as described above. However, in other embodiments, program instructions and/or data may be received, sent or stored upon different types of computer-accessible media. Generally speaking, a non-transitory computer-accessible medium may include computer-readable storage media or memory media such as magnetic or optical media, e.g., disk or DVD/CD-ROM coupled to computer system 1100 via I/O interface 1130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In one embodiment, the relationship between control system 1160 and I/O devices 1150 may be a server/client type of relationship. For example, control system 1160 may be configured as a server computer system 1100 that may convey instructions to and receive acknowledgements from I/O devices 1150 (including, but not limited to, video cameras of a video-based monitoring system and/or communication devices). In such an embodiment, I/O devices 1150 may be relatively simple or "thin" client devices. For example, I/O devices 1150 may be configured as dumb terminals with display, data entry and/or communications capabilities, but otherwise little computational functionality. However, in some embodiments, I/O devices 1150 (including, but not limited to, video cameras of a video-based monitoring system and/or communication devices) may be computer systems configured similarly to computer system 1100, including one or more processors 1110 and various other devices (though in some embodiments, a computer system 1100 implementing an I/O device 1150 may have somewhat different devices, or different classes of devices, compared to a computer system 1100 implementing control system 990). It is further contemplated that in some embodiments, the functionality of control system 990 may be distributed across some or all of I/O devices 1150. That is, in some embodiments, there may be no centralized point of control of the activity of materials handling facility agents; rather, I/O devices 1150 may function in a cooperative, distributed fashion to coordinate the activities of the materials handling facility.

In various embodiments, I/O devices 1150 may include, but are not limited to, one or more of: video cameras, handheld devices, devices worn by or attached to the agents, and devices integrated into or mounted on any mobile or fixed equipment of the materials handling facility such as pushcarts, bins, totes, racks, shelves, tables, ceilings, walls, and work benches, according to various embodiments. As noted above, video cameras included in a video-based monitoring system may or may not be configured to apply the analytics described herein for determining an appropriate resolution and/or frame rate or for automatically controlling these parameters in response to detecting conditions or events that indicate higher-resolution video monitoring is warranted. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with control system 1160. In general, an I/O device 1150 may be any device that can communicate with control system 1160 and convey instructions to agents within the facility. In one embodiment, at least some of the I/O devices 1150 may be configured to scan or otherwise read or receive codes or identifiers of various components in the materials handling facility and to communicate the entered codes to control system 1160 for use in directing agents in the various operations of the facility (e.g., bar code scanners, RFID readers, cameras, or any other sensing devices). Such components may include, but are not limited to, one or more of items, orders, modular sorting stations, modular bins, and compartments of modular bins.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more video cameras located in a materials handling facility; and
   a control system configured to communicate with the one or more video cameras;
   wherein the control system is further configured to:
      analyze a video stream that was captured by a particular one of the one or more video cameras using an initial resolution and frame rate, wherein to analyze the video stream, the control system is configured to apply a color-matching or pattern-matching function to the video stream to determine whether a specific color or pattern that has been designated as being associated with high-value items is visible in the video stream;
      determine, dependent on the analysis, whether an item designated as a high-value item is being handled in a portion of the materials handling facility that is in a field of view of the particular one of the one or more video cameras; and
      initiate an increase in the resolution or frame rate at which the particular video camera captures video streams in response to determining that an item designated as a high-value item is being handled in the portion of the materials handling facility that is in the field of view of the particular video camera.

2. The system of claim 1, wherein to determine whether an item designated as a high-value item is being handled in the portion of the materials facility that is in the field of view of the particular video camera, the control system is configured to:
   detect, in the video stream, the presence of an agent wearing an article of clothing or other wearable object having a color or pattern that has been designated as indicating an authorization to handle items designated as high-value items stored in the materials handling facility, or a device or a piece of equipment being used by an agent in the portion of the materials handling facility having or being tagged with a color or pattern that has been designated as indicating an authorization to handle items designated as high-value items stored in the materials handling facility.

3. The system of claim 1, wherein to determine whether an item designated as a high-value item is being handled in the portion of the materials facility that is in the field of view of the particular video camera, the control system is configured to:
  detect, in the video stream, that a tag, wrapper, or other indicator has been added to an item or its packaging that comprises a color or pattern that has been designated as indicating that the item is considered a high-value item.

4. A method, comprising:
performing, by one or more computers:
  analyzing video information obtained by a camera in a materials handling facility, wherein a portion of the materials handling facility is in a field of view of the camera;
  determining, dependent on said analyzing, that an item designated as a high-value item is present in the portion of the materials handling facility, and that a condition or event warranting high-resolution video monitoring affects the portion of the materials handling facility; and
  initiating an increase in a resolution at which the camera captures video information in response to said determining.

5. The method of claim 4, wherein the event comprises a detection of movement in the portion of the materials handling facility.

6. The method of claim 4, wherein the condition comprises the presence of an agent loitering in the portion of the materials handling facility.

7. The method of claim 4, further comprising:
  initiating an increase in a frame rate at which the camera captures video information.

8. A non-transitory computer-readable storage medium, storing program instructions that when executed on one or more computers cause the one or more computers to perform:
  accessing a video stream obtained by a particular video camera;
  determining, dependent on the video stream, whether a pre-defined condition exists in a portion of a materials handling facility that is in a field of view of the particular video camera, wherein said determining whether the pre-defined condition exists comprises determining whether or not a pre-defined indication that an item designated as a high-value item is being handled in the portion of the materials handling facility is visible in the video stream; and
  initiating an increase in a resolution or a frame rate at which one or more video cameras in the materials handling facility capture video streams in response to determining that the pre-defined condition exists in the portion of the materials handling facility that is in the field of view of the particular video camera.

9. The non-transitory computer-readable storage medium of claim 8, wherein said initiating an increase in a resolution or frame rate at which one or more video cameras in the materials handling facility capture video streams comprises initiating an increase in the resolution or the frame rate at which the particular video camera captures video streams.

10. The non-transitory computer-readable storage medium of claim 9, wherein when executed on the one or more computers, the program instructions further cause the one or more computers to perform:
  determining that the pre-defined condition no longer exists in the portion of the materials handling facility; and
  in response to determining that the pre-defined condition no longer exists, decreasing the resolution or the frame rate at which the particular video camera captures video streams.

11. The non-transitory computer-readable storage medium of claim 8, wherein said initiating an increase in a resolution or frame rate at which one or more video cameras in the materials handling facility capture video streams comprises initiating an increase in the resolution or frame rate at which one or more video cameras other than the particular video camera capture video streams, and wherein the one or more other video cameras are trained on portions of the materials handling facility that are adjacent to the portion of the materials handling facility that is in the field of view of the particular video camera.

12. The non-transitory computer-readable storage medium of claim 8, wherein said determining that the pre-defined condition exists comprises detecting, in the video stream, a tag, wrapper, or other indicator that has been added to an item being handled in the portion of the materials handling facility or to its packaging indicating that the item has been designated as a high-value item.

13. The non-transitory computer-readable storage medium of claim 8, wherein said determining that the pre-defined condition exists comprises detecting, in the video stream, an agent in the portion of the materials handling facility wearing an article of clothing or other wearable object having a color or pattern that has been designated as indicating an authorization to handle items designated as high-value items, or a device or a piece of equipment being used by an agent in the portion of the materials handling facility having a color or pattern that has been designated for operations involving items designated as high-value items.

14. The non-transitory computer-readable storage medium of claim 8, wherein the pre-defined indication comprises an agent, an item, a device or a piece of equipment in the portion of the materials handling facility having an emitter that emits visible or infrared light in a pattern designated for operations involving items designated as high-value items.

15. The non-transitory computer-readable storage medium of claim 8, wherein said determining that the pre-defined condition exists comprises detecting, in the video stream, an agent performing a pre-defined movement or gesture indicating that the agent requires assistance in the portion of the materials handling facility that is in the field of view of the particular video camera.

16. The non-transitory computer-readable storage medium of claim 8, wherein said determining that the pre-defined condition exists comprises detecting, in the video stream, that an adverse environmental condition exists in the portion of the materials handling facility that is in the field of view of the particular video camera.

17. The non-transitory computer-readable storage medium of claim 16, wherein said detecting the adverse environmental condition comprises detecting the presence of fire, smoke, water, or a hazardous substance in the portion of the materials handling facility that is in the field of view of the particular video camera.

18. The non-transitory computer-readable storage medium of claim 8, wherein when executed on the one or more computers, the program instructions further cause the one or more computers to perform:
  triggering an alarm or alert indicating the pre-defined condition in response to determining that the pre-defined condition exists in the portion of the materials handling facility that is in the field of view of the particular video camera.

19. The non-transitory computer-readable storage medium of claim 8, wherein when executed on the one or more computers, the program instructions further cause the one or more computers to perform:

initiating an increase in retention time for at least a portion of the video steam captured by the particular video camera at the increased resolution or frame rate in response to determining that the pre-defined condition exists in the portion of the materials handling facility that is in the field of view of the particular video camera.

20. The non-transitory computer-readable storage medium of claim 8, wherein said determining that the pre-defined condition exists comprises detecting, in the video stream, a visual indicator of an alert or alarm that has been triggered in the materials handling facility.

21. The non-transitory computer-readable storage medium of claim 8, wherein said determining that the pre-defined condition exists comprises:
   analyzing the video stream; and
   determining that the particular video camera has been damaged, moved or repositioned in the materials handling facility.

22. A device, comprising:
   one or more processors;
   a video capture component, wherein a field of view of the video capture component comprises a portion of a materials handling facility; and
   a memory storing program instructions that when executed by the one or more processors cause the one or more processors to perform:
      initiating capture of a video stream by the video capture component using an initial resolution and an initial frame rate;
      detecting a condition in the portion of the materials handling facility under which a particular visual indicator is expected to be visible in the portion of the materials handling facility;
      in response to said detecting, determining, dependent on the video stream, whether the particular visual indicator is visible in the portion of the materials handling facility; and
      in response to determining that the particular visual indicator is not visible in the portion of the materials handling facility:
         increasing one or more of the resolution or the frame rate at which the video capture component captures video streams; and
         continuing the capture of the video stream by the video capture component using the increased resolution or frame rate.

23. The device of claim 22,
   wherein the condition comprises an agent performing an operation involving an item designated as a high-value item in the portion of the materials handling facility; and
   wherein the particular visual indicator comprises an agent wearing an article of clothing or other wearable object having a color or pattern that has been designated as indicating an authorization to handle items designated as high-value items stored in the materials handling facility, or a device or a piece of equipment being used by an agent in the portion of the materials handling facility having a color or pattern that has been designated as indicating an authorization to handle items designated as high-value items stored in the materials handling facility.

24. The device of claim 22, wherein the device is one of a plurality of video cameras in the materials handling facility, and wherein the fields of view of the plurality of video cameras collectively encompass all inventory areas of the materials handling facility.

\* \* \* \* \*